United States Patent
Ishikawa et al.

(10) Patent No.: US 7,593,148 B2
(45) Date of Patent: Sep. 22, 2009

(54) IMAGE COMPRESSING METHOD AND IMAGE COMPRESSION APPARATUS

(75) Inventors: Takashi Ishikawa, Tokyo (JP); Masaki Higurashi, Tokyo (JP)

(73) Assignee: Olympus Corporation, Tokyo (JP)

(\*) Notice: Subject to any disclaimer, the term of this patent is extended or adjusted under 35 U.S.C. 154(b) by 691 days.

(21) Appl. No.: 11/082,467

(22) Filed: Mar. 17, 2005

(65) Prior Publication Data
US 2005/0213812 A1 Sep. 29, 2005

(30) Foreign Application Priority Data
Mar. 26, 2004 (JP) .............................. 2004-093527

(51) Int. Cl.
*H04N 1/46* (2006.01)
*H04N 1/413* (2006.01)

(52) U.S. Cl. ................................. 358/539; 358/426.13

(58) Field of Classification Search ................. 358/1.9, 358/512, 515, 517, 518, 519, 426.02, 426.04, 358/426.06, 426.07, 426.13, 426.14
See application file for complete search history.

(56) References Cited

U.S. PATENT DOCUMENTS 6,959,385 B2 \* 10/2005 Murakami et al. .......... 713/176
7,515,632 B2 \* 4/2009 Dambrackas .......... 375/240.01

FOREIGN PATENT DOCUMENTS

| JP | 64-24634 | 1/1989 |
|---|---|---|
| JP | 2000-22960 | 1/2000 |
| JP | 2000-244935 | 9/2000 |
| JP | 2001-060876 | 3/2001 |
| JP | 2001-061067 | 3/2001 |
| JP | 2001-326939 | 11/2001 |
| JP | 2002-171531 | 6/2002 |
| JP | 2003-101792 | 4/2003 |
| JP | 2003-125209 | 4/2003 |

OTHER PUBLICATIONS

Notification of Rejection Grounds for Japanese Patent Application No. 2004-093527, mailed Dec. 2, 2008 (3 pgs.) with translation (2 pgs.).

\* cited by examiner

*Primary Examiner*—Douglas Q Tran
(74) *Attorney, Agent, or Firm*—Straub and Pokotylo; John C. Pokotylo

(57) ABSTRACT

An image compressing method includes: separating image data obtained from an image pickup device into each primary color component; obtaining difference data between each piece of image data of color components of colors other than a reference color in the image data separated into each primary color component, and the image data of the color component of the reference color; encoding the difference data to obtain a variable-length code; and encoding the image data of the color component of the reference color to obtain a predicted code.

6 Claims, 19 Drawing Sheets

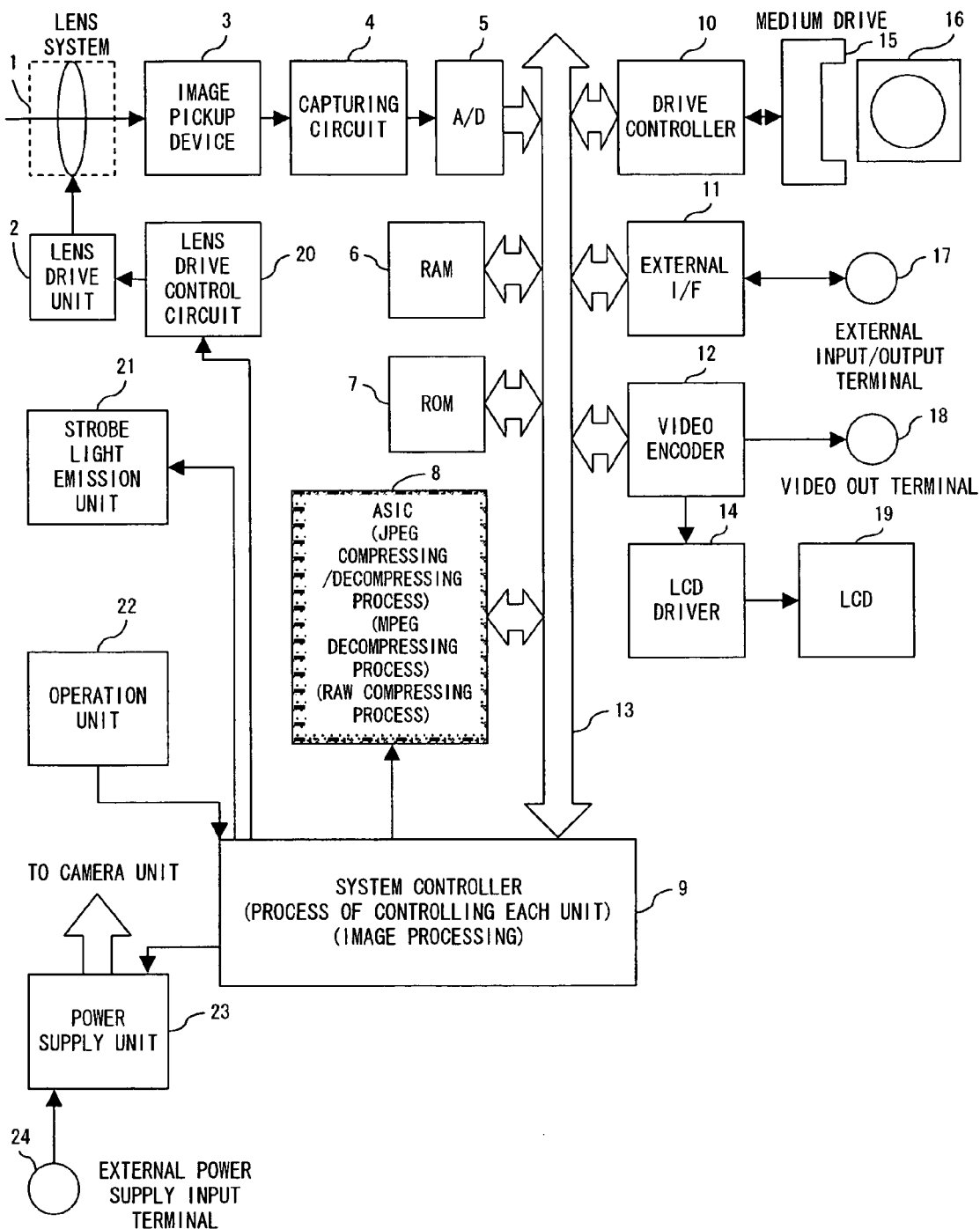
F I G. 1

| G | R | G | R | G | R | G | R | G | R | G | R |
|---|---|---|---|---|---|---|---|---|---|---|---|
| B | G | B | G | B | G | B | G | B | G | B | G |
| G | R | G | R | G | R | G | R | G | R | G | R |
| B | G | B | G | B | G | B | G | B | G | B | G |
| G | R | G | R | G | R | G | R | G | R | G | R |
| B | G | B | G | B | G | B | G | B | G | B | G |
| G | R | G | R | G | R | G | R | G | R | G | R |
| B | G | B | G | B | G | B | G | B | G | B | G |
| G | R | G | R | G | R | G | R | G | R | G | R |
| B | G | B | G | B | G | B | G | B | G | B | G |
| G | R | G | R | G | R | G | R | G | R | G | R |
| B | G | B | G | B | G | B | G | B | G | B | G |

FIG. 2

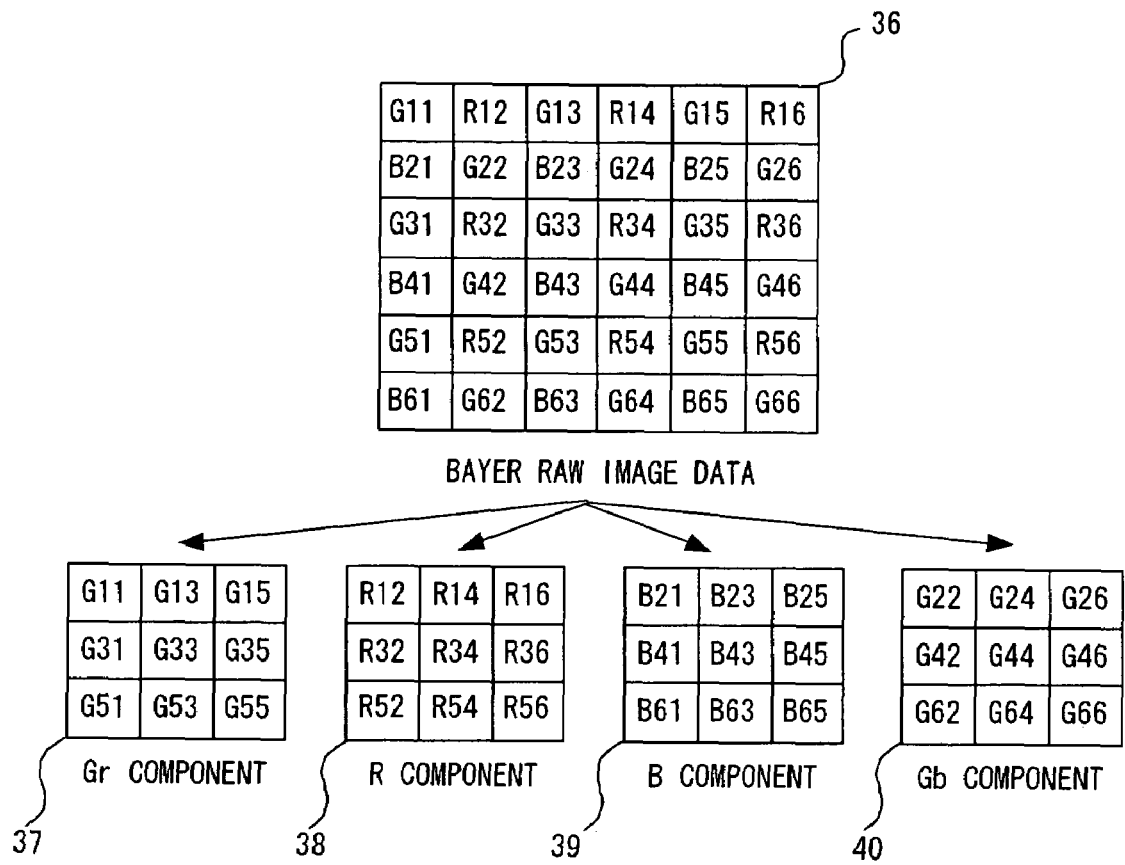
F I G. 4

| 127 | 0 | 127 | 0 | 127 | 0 |
|-----|-----|-----|-----|-----|-----|
| 255 | 127 | 255 | 127 | 255 | 127 |
| 127 | 0 | 127 | 0 | 127 | 0 |
| 255 | 127 | 255 | 127 | 255 | 127 |
| 127 | 0 | 127 | 0 | 127 | 0 |
| 255 | 127 | 255 | 127 | 255 | 127 |

FIG. 5

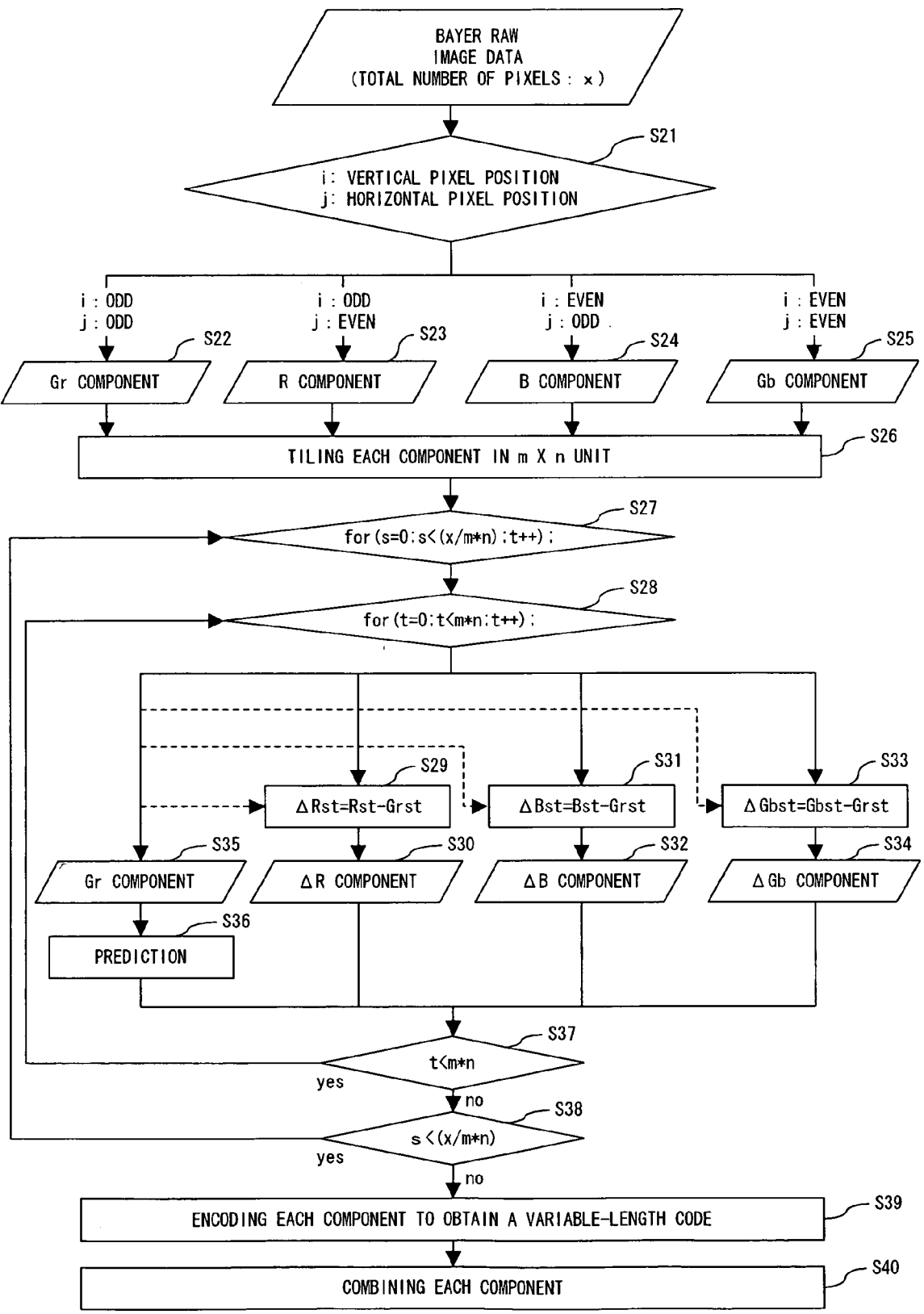
F I G. 9

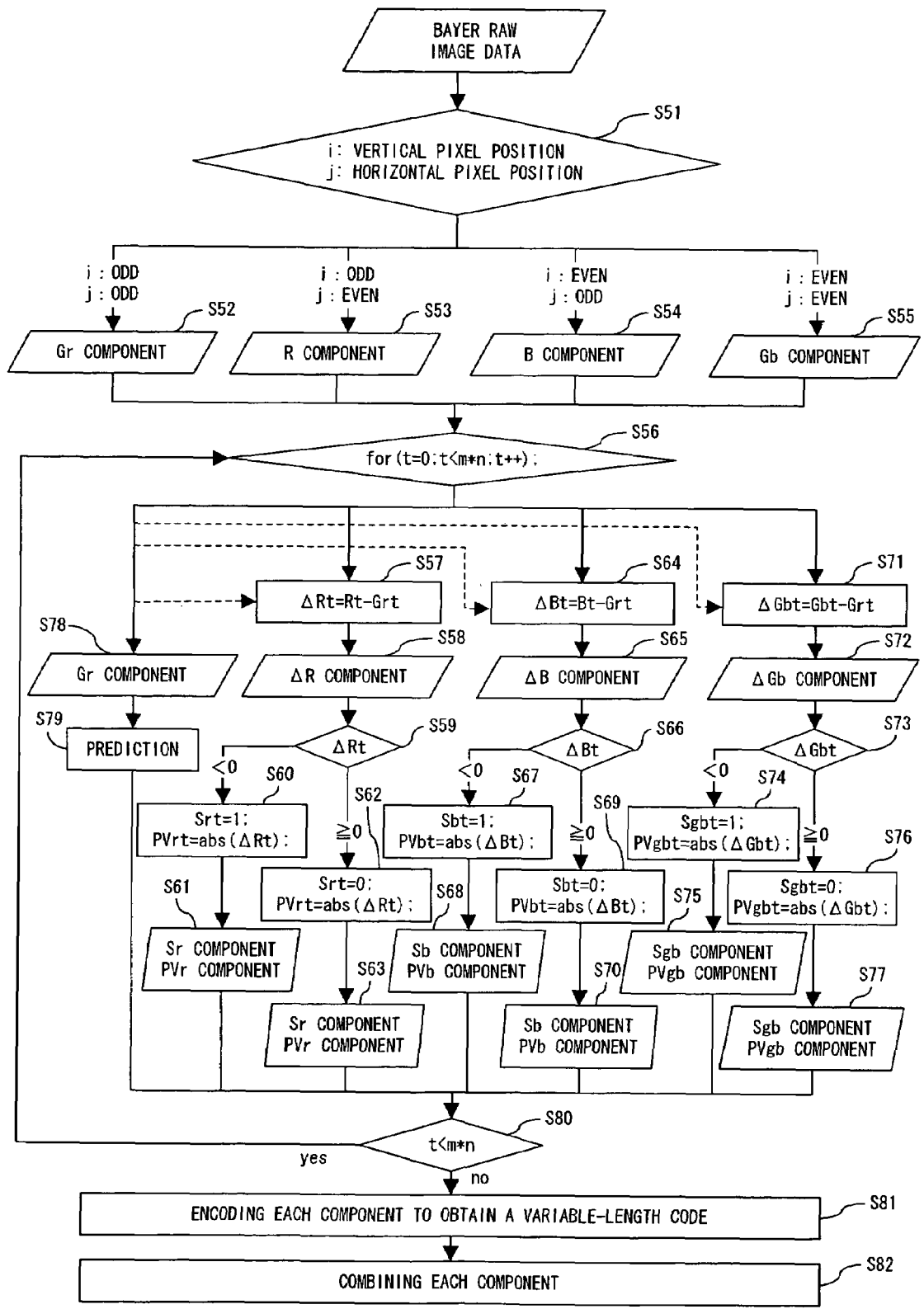
F I G. 12

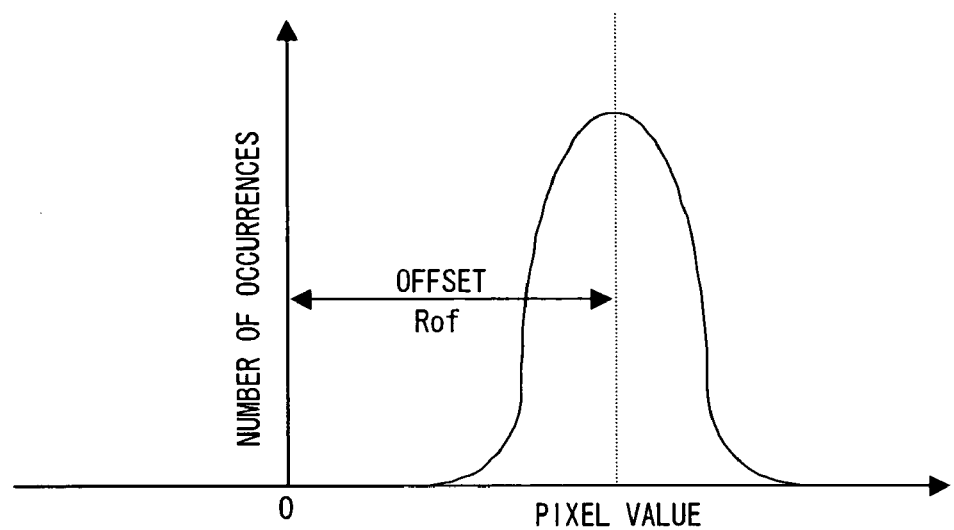
F I G. 1 6 A
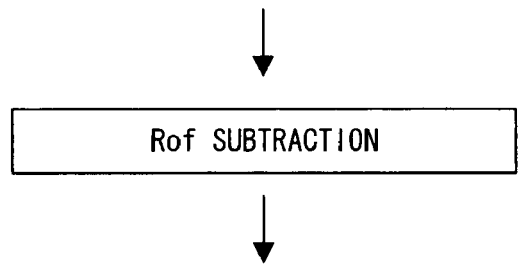
F I G. 1 6 B
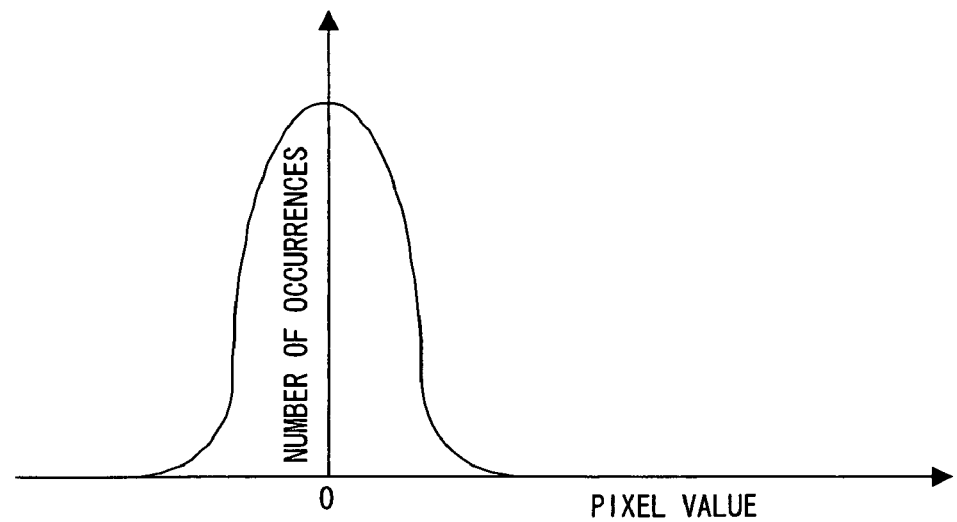
F I G. 1 6 C

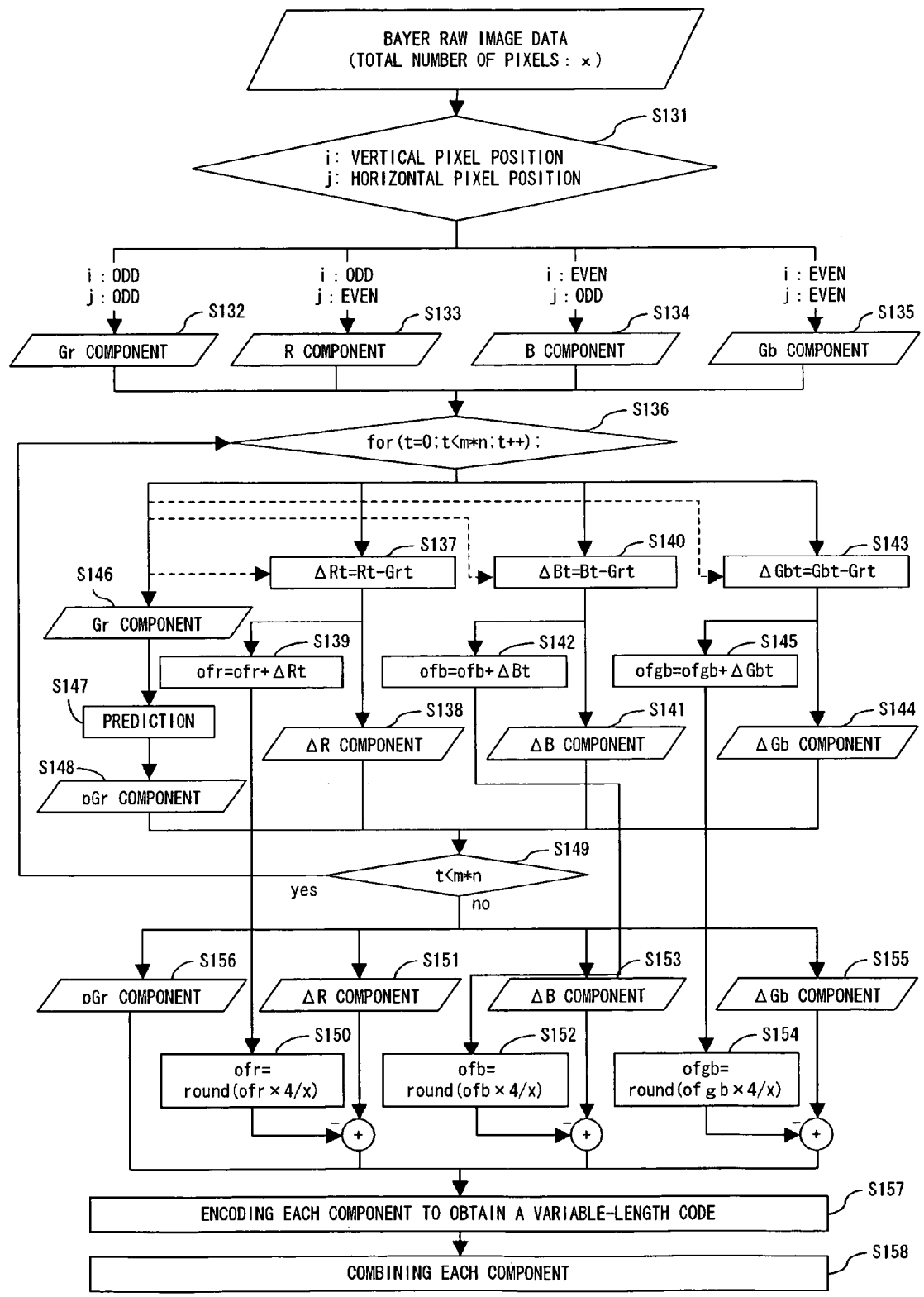
F I G. 17

IMAGE COMPRESSING METHOD AND IMAGE COMPRESSION APPARATUS

CROSS REFERENCE TO RELATED APPLICATIONS

This application is based upon and claims the benefit of priority from the prior Japanese Patent Application No. 2004-093527, filed Mar. 26, 2004, the entire contents of which are incorporated herein by reference.

BACKGROUND OF THE INVENTION

1. Field of the Invention

The present invention relates to an image compressing method and an image compression apparatus for lossless compressing image data obtained from an image pickup device.

2. Description of the Related Art

Electronic cameras have become remarkably widespread, but a number of them reserve the number of captured records by lossy compressing image data due to the restrictions on the recording capacity of an image record medium.

There also is a recording system for enhancing the quality of playback images of image data by increasing the recorded data capacity per image while reducing a compression rate or performing a non-compressing process. One of the recording systems is a RAW image data recording system. The RAW image data recording system omits a series of digital image processing operations in an electronic camera, A/D converts the output of an image pickup device, and then digitally record the converted data. The RAW image data have required a larger image recording capacity per image with an increasing pixels required for an image pickup device. Therefore, there is a strong demand for reducing the requirements for the image recording capacity without degrading the quality of playback images by lossless compressing the RAW image data.

If data values are locally distributed in a process area when image data is lossless compressed, then the compression rate (coding efficiency) can be enhanced in entropy coding. Since adjacent pixels have different color components in the RAW image data output from an image pickup device to which a Bayer filter is applied, the correlation between adjacent pixels is rather small in most cases. Therefore, it has not been easy to raise the compression rate when Bayer RAW image data is lossless compressed.

On the other hand, an apparatus for lossless compressing and recording CCD-RAW data is disclosed by, for example, Japanese Published Patent Application No. 2001-60876, Japanese Published Patent Application No. 2001-61067, Japanese Published Patent Application No. 2001-326939. Japanese Published Patent Application No. 2002-171531 also discloses the configuration in which a pixel signal of a solid-state image pickup device is separated for each pixel, a difference signal or a ratio signal between a reference signal and another signal is obtained, and a data file is generated and recorded from the difference signal or the ratio signal between the reference signal and the other signal. Additionally, Japanese Published Patent Application No. 2003-125209 discloses the apparatus including a compressing unit for separating and extracting Bayer RAW image data for each color component, and performing a series of compressing processes for each color component.

SUMMARY OF THE INVENTION

An aspect of the present invention is an image compressing method of separating image data obtained from an image pickup device into each primary color component, obtaining difference data between each piece of image data of color components of colors other than a reference color in the image data separated into each primary color component and the image data of the color component of the reference color, encoding the difference data to obtain a variable-length code, and encoding the image data of the color component of the reference color to obtain a predicted code.

Another aspect of the present invention is an image compression apparatus including: a color separation unit for separating image data obtained from an image pickup device into each primary color component; a difference generation unit for obtaining difference data between each piece of image data of color components of colors other than a reference color in the image data separated by the color separation unit into each primary color component, and the image data of the color component of the reference color; a variable-length code unit for encoding the difference data obtained by the difference generation unit to obtain a variable-length code; and a predicted code unit for encoding the image data of the color component of the reference color to obtain a predicted code.

BRIEF DESCRIPTION OF THE DRAWINGS

FIG. 1 shows the configuration of the electronic camera according to an embodiment 1;

FIG. 2 shows the color filter array of a Bayer array;

FIG. 4 is an explanatory view of the process performed by the color separation unit;

FIG. 5 is an explanatory view of the process performed by the difference generation unit;

FIG. 9 is a flowchart relating to the RAW compressing process according to a variation of the embodiment 1;

FIG. 12 is a flowchart relating to the RAW compressing process according to the embodiment 2;

FIG. 16A is a first explanatory view of the process performed by the offset calculation unit and the offset subtraction unit;

FIG. 16B is a second explanatory view of the process performed by the offset calculation unit and the offset subtraction unit;

FIG. 16C is a third explanatory view of the process performed by the offset calculation unit and the offset subtraction unit;

FIG. 17 is a flowchart relating to the RAW compressing process according to the embodiment 3;

DESCRIPTION OF THE PREFERRED EMBODIMENT

Figure 3:
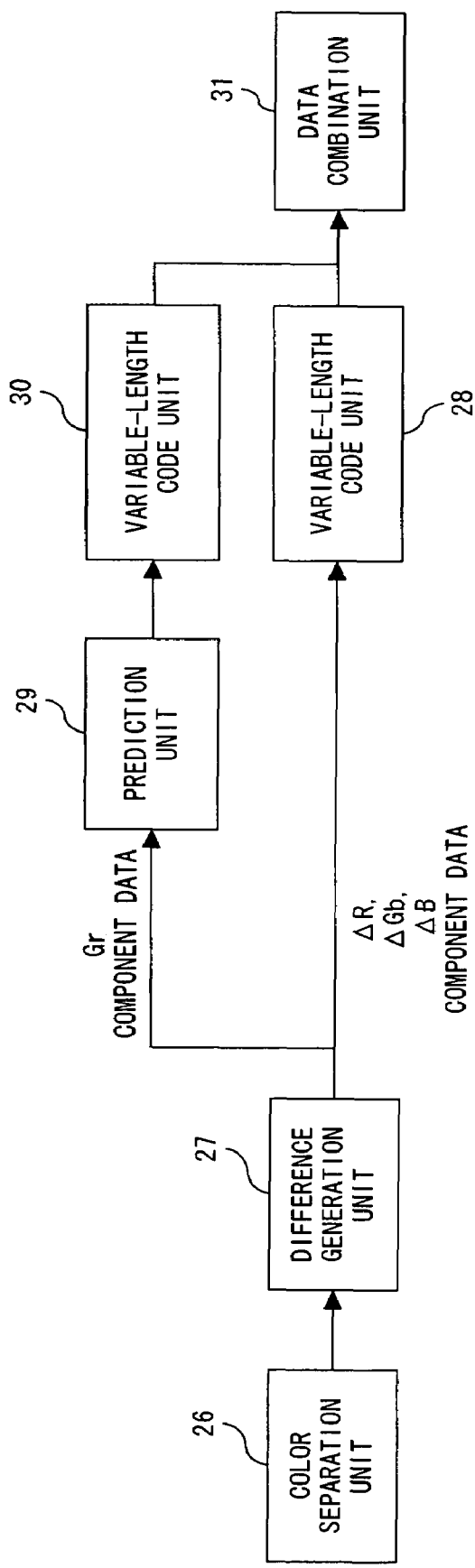
FIG. 3 is a block diagram showing the function relating to the RAW compressing process according to the embodiment 1.

The embodiments of the present invention are explained below by referring to the attached drawings.

Embodiment 1

FIG. 1 shows the configuration of the electronic camera according to an embodiment 1 of the present invention.

The electronic camera has the function of lossless compressing the image data obtained from an image pickup device in a capturing operation, and recording the resultant data on a record medium, and also is an electronic camera having an image compression apparatus for performing the lossless compressing process (hereinafter referred to as a "RAW compressing process".

In FIG. 1, a lens system 1 is driven by a lens drive unit 2, and forms a subject image on an image pickup device 3. The image pickup device 3 optoelectronically transduces the formed subject image and outputs an electric signal. In the present embodiment, an image pickup device of a single plate type in which a color filter array of a Bayer array shown in FIG. 2 is applied as the image pickup device 3. A capturing circuit 4 performs a capturing process on the input electric signal, and outputs an electric signal obtained as a result of the process. An A/D 5 A/D converting the input electric signal and outputs a digital electric signal.

In the descriptions below, the digital electric signal which is an output signal of the A/D 5 is referred to as Bayer RAW image data as the image data obtained from the image pickup device 3.

Each of the A/D 5, RAM 6, ROM 7, an ASIC (Application Specific Integrated Circuit) 8, a system controller 9, a drive controller 10, an external I/F 11, and a video encoder 12 is connected to each other through a bus 13, and can transmit and receive data as necessary.

The RAM 6 is memory used for temporarily storing Bayer RAW image data output from the A/D 5, for temporarily storing image data being processed in the compressing or decompressing process by the ASIC 8, and as a work area in which the control process is performed by the system controller 9.

The ROM 7 is memory storing a camera program for controlling the operation of the entire electronic camera and necessary arithmetic data. The camera program contains an image processing program relating to the RAW compressing process, etc.

Under the control of the system controller 9, the ASIC 8 performs the RAW compressing process on the Bayer RAW image data, the JPEG (Joint Photographic Expert Group) compressing process on image data, and the JPEG decompressing process or the MPEG (Moving Picture Experts Group) decompressing process on the JPEG compressed image data or the MPEG compressed image data.

The system controller 9 comprises a CPU (Central Processing Unit), and the CPU executes the camera program stored in the ROM 7, thereby controlling the operation of the entire electronic camera, and performing the control process on each unit and various image processing operations.

The drive controller 10 controls a medium drive to write data to a disk 16 which is a record medium attached to the medium drive 15 or read data from the disk 16.

The external I/F 11 is an interface for transmitting and receiving data to and from the device connected to an external input/output terminal 17.

The video encoder 12 encodes image data obtained for display from the system controller 9, etc. to a predetermined video signal, and outputs the result to the video out terminal 17 and the LCD driver 14. For example, if a display device is connected to the video out terminal 17, a picture depending on the video signal can be displayed on the display device.

An LCD (Liquid Crystal Display) driver 14 drives an LCD 19, receives a video signal from the video encoder 12, thereby displaying the picture depending on the video signal on the LCD 19.

A lens drive control circuit 20 controls the lens drive unit 2 to drive the lens system 1 under the control of the system controller 9.

A strobe light emission unit 21 emits strobe light under the control of the system controller 9. An operation unit 22 is configured by various buttons, levers, switches, etc., receives various instructions from a user, and notifies the system controller 9 of the instructions.

A power supply unit 23 controls the voltage of a battery (not shown in the attached drawings) or the voltage of the power input to an external power supply input terminal 24, and supplies electric power to each unit configuring the electronic camera.

The RAW compressing process performed by the ASIC 8 under the control of the system controller 9 in the electronic camera with the above-mentioned configuration is explained by referring to FIGS. 3 through 6.

FIG. 3 is a block diagram of the configuration relating to the RAW compressing process in the electronic camera. Each component shown in FIG. 3 is realized by the ASIC 8 under the control of the system controller 9.

In FIG. 3, a color separation unit 26 separates Bayer RAW image data to be processed into each color component. Practically, when the Bayer RAW image data to be processed is Bayer RAW image data 36 formed by the pixels of 6 rows×6 columns shown in FIG. 4, the color separation unit 26 separates the Bayer RAW image data 36 into a Gr (green) component RAW image data 37 which is a color component of a pixel of an odd-numbered row and an odd-numbered column, a R (red) component RAW image data 38 which is a color component of a pixel of an odd-numbered row and an even-numbered column, a B (blue) component RAW image data 39 which is a color component of a pixel of an even-numbered row and an odd-numbered column, and a Gb (green) component RAW image data 40 which is a color component of a pixel of an even-numbered row and an even-numbered column.

A difference generation unit 27 obtains difference data between each of the RAW image data of the color component other than the color component of a predetermined reference color in the RAW image data separated into each color component by the color separation unit 26 and the RAW image data of the color component of the reference color. In the present embodiment, the Gr component is applied as the color component of a reference color.

Assume that each piece of the RAW image data separated into each color component by the color separation unit 26 is the RAW image data formed by the pixels of m rows×n columns, and the corresponding pixel position of each color component is expressed by (row, column)=(i, j), the difference data between each piece of the RAW image data of the color components of R, B, and Gb and the RAW image data of the Gr component can be obtained by the following equations.

$$\Delta R = R(i, j) - Gr(i, j)$$

$$\Delta B = B(i, j) - Gr(i, j)$$

$$\Delta Gb = Gb(i, j) - Gr(i, j)$$

$$1 \leq i \leq m, 1 \leq j \leq n$$

where Gr (i, j) indicates the pixel value of the pixel position (i, j) of the RAW image data of the Gr component, R (i, j) indicates the pixel value of the pixel position (i, j) of the RAW image data of the R component, B (i, j) indicates the pixel value of the pixel position (i, j) of the RAW image data of the B component, and Gb (i, j) indicates the pixel value of the pixel position (i, j) of the RAW image data of the Gb component. $\Delta R$ indicates the difference in pixel value between the pixel position (i, j) of the RAW image data of the R component and the pixel position (i, j) of the RAW image data of the Gr component, $\Delta B$ indicates the difference in pixel value between the pixel position (i, j) of the RAW image data of the B component and the pixel position (i, j) of the RAW image data of the Gr component, and $\Delta Gb$ indicates the difference in pixel value between the pixel position (i, j) of the RAW image data of the Gb component and the pixel position (i, j) of the RAW image data of the Gr component.

Thus, the difference generation unit 27 obtains all differences $\Delta R$, $\Delta B$, and $\Delta Gb$ in pixel value between the Gr component and each of the color components of R, B, and Gb at each pixel position of the RAW image data, thereby obtaining the difference data between the Gr component of the reference color and each of the color components of R, B, and Gb.

For example, when the Bayer RAW image data to be processed is shown in FIG. 5, the difference in pixel value between the Gr component and each of the color components of R, B, and Gb at each pixel position of the RAW image data is expressed by $\Delta R = -127$ (=0−127), $\Delta B = 128$ (=255−128), and $\Delta Gr = 0$ (=127−127).

A variable-length code unit 28 encodes the difference data between the Gr component and each of the color components of R, B, and Gb obtained by the difference generation unit 27 to obtain a variable-length code for each color component (entropy coding).

Each piece of the difference data between each of the color components R, B, and Gb and the Gr component is considered to be the data having a locally distributed value. That is, since the Gb component is the same color component as the Gr component of a reference color, it is predicted that the data has a value locally distributed around 0. Each of the color components of R and B is considered to be the data having a value locally distributed around an offset value. Therefore, the variable-length code unit 28 can encode the data having a locally distributed value to obtain a variable-length code, thereby lossless compressing the data at a high compression rate.

A prediction unit 29 and a variable-length code unit 30 encode the RAW image data of the Gr component of a reference color to obtain a predicted code. Practically, the prediction unit 29 obtains a predicted value by a predetermined prediction equation from the correlation of adjacent pixels in the RAW image data of the Gr component, and obtains all differences in pixel value from a predicted value at each pixel position, thereby obtaining the difference data from the predicted value of the Gr component. The variable-length code unit 30 encodes the difference data from the predicted value of the Gr component to obtain a variable-length code.

The encoding to obtain a variable-length code performed by the variable-length code unit 28 and the variable-length code unit 30 can also be performed by any of the widely used coding methods such as the Huffman coding, arithmetic coding, etc.

A data combination unit 31 combines the difference data between each of the color components of R, B, and Gb encoded to obtain a variable-length code by the variable-length code unit 28 and the Gr component and the difference data between the Gr component encoded by the variable-length code unit 30 to obtain a variable-length code and the predicted value, and finally generates a file. Thus, Bayer RAW image data is obtained as a result of performing the RAW compressing process.

In FIG. 3, after the completion of the difference generation unit 27, the process by the prediction unit 29 is started, but actually it is started simultaneously with the start of the process of the difference generation unit 27 or during the process of the unit 27.

Figure 6:
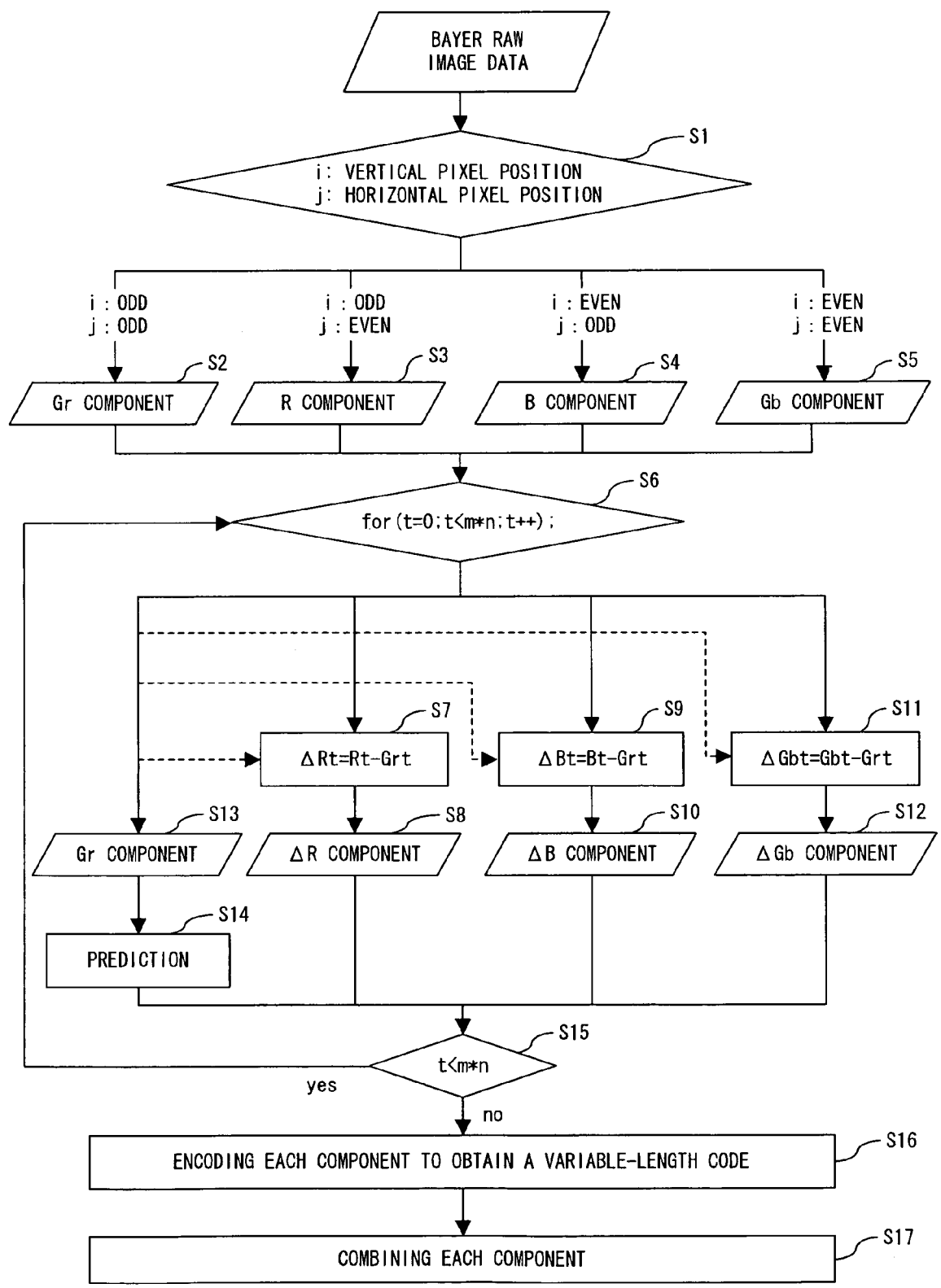
FIG. 6 is a flowchart relating to the RAW compressing process according to the embodiment 1.

FIG. 6 is a flowchart relating to the RAW compressing process.

In FIG. 6, in S1 through S6, the color separation unit 26 separates the Bayer RAW image data to be processed into each of the color components. Practically, first, assume that the pixel positions in the vertical and horizontal directions of the Bayer RAW image data can be specified respectively by i and j (S1), the color separation unit 26 extracts a pixel having an odd number for i and j to obtain the RAW image data of the Gr component (S2), extracts a pixel having an odd number for i and an even number for j to obtain the RAW image data of the R component (S3), extracts a pixel having an even number for i and an odd number for j to obtain the RAW image data of the B component (S4), and extracts a pixel having an even number for i and j to obtain the RAW image data of the Gb component (S5).

In the present embodiment, assume that the RAW image data formed by pixels of m rows×n columns is obtained for each of the color components, and the relationship in pixel position between each pixel of the Bayer RAW image data to be processed and each pixel of the RAW image data of each color component after the separation is the pixel position as shown in FIG. 4.

Then, for the RAW image data of the color components of Gr, R, B, and Gb, the pixel position corresponding to each color component in space is designated by t ($0 \leq t \leq m \times n$), and t is set to 0 (t=0) (S6).

Then, in S7 through S12, the difference generation unit 27 performs the process of obtaining the difference between the Gr component and the RAW image data of each of the color components of R, B, and Gb at the pixel position t. Practically, the difference $\mathit{\Delta}Rt$ between the pixel value Rt at the pixel position t of the RAW image data of the R component and the pixel value Grt at the pixel position t of the RAW image data of the Gr component is calculated (S7), thereby the difference data $\mathit{\Delta}R$ between the R component and the Gr component at the pixel position t of the RAW image data is obtained (S8). Similarly, the difference $\mathit{\Delta}Bt$ between the pixel value Bt at the pixel position t of the RAW image data of the B component and the pixel value Grt at the pixel position t of the RAW image data of the Gr component is calculated (S9), thereby the difference data $\mathit{\Delta}B$ between the B component and the Gr component at the pixel position t of the RAW image data is obtained (S10), and the difference $\mathit{\Delta}Gbt$ between the pixel value Gbt at the pixel position t of the RAW image data of the Gb component and the pixel value Grt at the pixel position t of the RAW image data of the Gr component is calculated (S11), thereby the difference data $\mathit{\Delta}Gb$ between the Gb component and the Gr component at the pixel position t of the RAW image data is obtained (S12).

In S13 and S14, the prediction unit 29 performs the process of obtaining the difference between the Gr component and the predicted value at the pixel position t of the RAW image data. Practically, the prediction unit 29 calculates the difference between the pixel value Grt at the pixel position t of the RAW image data of the Gr component and the obtained predicted value, thereby obtains the difference data between the Gr component and the predicted value at the pixel position t of the RAW image data.

Then, it is determined whether or not t<m×n (S15). If the determination result is YES, control is returned to S6, t=t+1 is set in S6, and the above-mentioned process is repeated on the next pixel position.

Thus, by repeatedly performing the process in S6 through S15, all of the difference in pixel value between the Gr component at each pixel position of the RAW image data and each of the color components of R, B, and Gb, and the difference in pixel value between the Gr component and the predicted value at each pixel position of the RAW image data, thereby obtaining the difference data between the Gr component and each of the color components of R, B, and Gb and the difference data between the Gr component and the predicted value.

If the determination result in S15 is NO, the variable-length code unit 28 encodes the difference data between the Gr component and each of the color components of R, B, and Gb to obtain a variable-length code for each color component, and the variable-length code unit 30 encodes the difference data between the predicted value and the Gr component to obtain a variable-length code (S16).

Then, the data combination unit 31 combines the difference data between the Gr component and each color component of R, B, and Gb encoded by the variable-length code unit 28 to obtain a variable-length code for each color component with the difference data between the predicted value and the Gr component encoded by the variable-length code unit 30 to obtain a variable-length code (S17), thereby terminating the flow.

According to the present embodiment, the Bayer RAW image data is separated into each color component, the difference data between the color component of the reference color and each of the color components other than a reference color component is obtained, and the result is encoded to obtain a variable-length code, thereby performing lossless compression at a high compression rate.

According to the present embodiment, the above-mentioned RAW compressing process can be transformed as follows.

Figure 7:
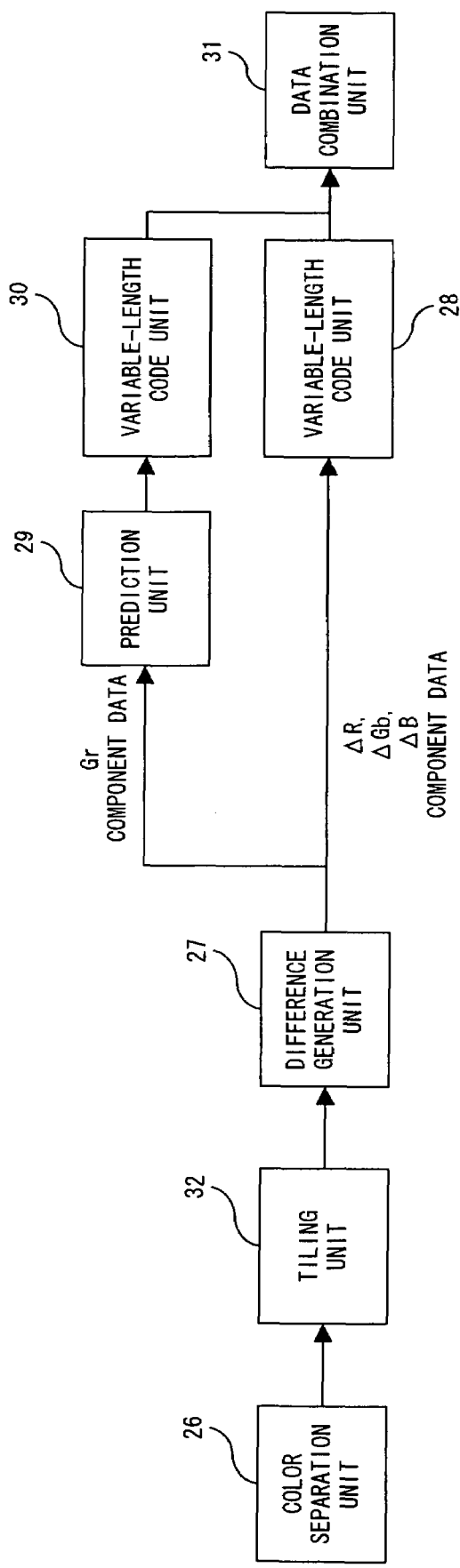
FIG. 7 is a block diagram showing the function relating to the RAW compressing process according to a variation of the embodiment 1.

FIG. 7 is a block diagram showing the function relating to the RAW compressing process according to a variation of the present embodiment. Each component shown in FIG. 7 is also realized by the ASIC 8 under the control of the system controller 9.

In FIG. 7, the difference from what is shown in FIG. 3 is a tiling unit 32 provided between the color separation unit 26 and the difference generation unit 27. The tiling unit 32 separates (tiles) the RAW image data separated into each color component by the color separation unit 26 in predetermined size units of, for example, pixels of m rows×n columns of RAW image data.

Figures 8A, 8B:
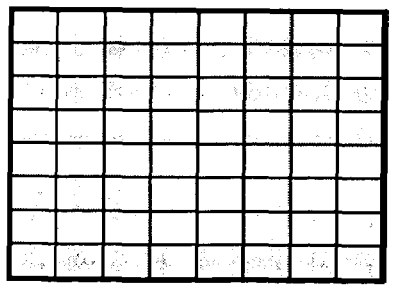
FIG. 8A is a first explanatory view of the process performed by the tiling unit.
FIG. 8B is a second explanatory view of the process performed by the tiling unit.

For example, if the RAW image data of R component (or Gr, B, or Gb component) obtained by the color separation unit 26 is the RAW image data formed by the pixels of 24 rows×24 columns shown in FIG. 8A, and the tiling unit 32 tiles the data in the RAW image data in the pixel units of 8 rows×8 columns (m=n=8), then a piece of tiled RAW image data is the RAW image data of 8 rows×8 columns shown in FIG. 8B.

Then, at the subsequent stage of the color separation unit 26, the process is performed for each of the tiled RAW image data.

FIG. 9 is a flowchart relating to the RAW compressing process according to a variation of the embodiment.

In FIG. 9, in S21 through S25, as in S1 through S5 shown in FIG. 6, the color separation unit 26 separates the Bayer RAW image data (however, the Bayer RAW image data of the total number x of pixels) to be processed into each color component.

Then, the tiling unit 32 tiles each piece of RAW image data separated into each color component by the color separation unit 26 for each piece of RAW image data formed by the pixels of m rows×n columns (S26).

Then, in the tiled RAW image data of each of the color components of Gr, R, B, and Gb, the tiled RAW image data of each color component corresponding in space is designated by s ($0 \leq s < x/m \times n$), and in the tiled RAW image data designated by s of each color component, the pixel position corresponding in space of each color component is designated by t ($0 \leq t < m \times n$), s is set to 0 (s=0) (S27), and then t is set to 0 (t=0) (S28)

Then, in S29 through S34, the difference generation unit 27 performs the process of obtaining the difference between the Gr component and the tiled RAW image data s of each of the color components of R, B, and Gb at the pixel position t. Practically, the difference generation unit 27 calculates the difference $\mathit{\Delta}Rst$ between the pixel value Rst at the pixel position t of the tiled RAW image data s of the R component and the pixel value Grst at the pixel position t of the tiled RAW image data s of the Gr component (S29), thereby obtains the difference data $\mathit{\Delta}R$ in pixel value between the Gr component and the R component at the pixel position t of the tiled RAW image data s (S30). Similarly, it calculates the difference $\mathit{\Delta}Bst$ between the pixel value Bst at the pixel position t of the tiled RAW image data s of the B component and the pixel value Grst at the pixel position t of the tiled RAW image data s of the Gr component (S31), thereby obtains the difference data $\mathit{\Delta}B$ in pixel value between the Gr component and the B component at the pixel position t of the tiled RAW image data s (S32), and calculates the difference $\mathit{\Delta}Gbst$ between the pixel value Gbst at the pixel position t of the tiled RAW image data s of the Gb component and the pixel value Grst at the pixel position t of the tiled RAW image data s of the Gr component (S33), thereby obtains the difference data $\mathit{\Delta}Gb$ in pixel value between the Gr component and the Gb component at the pixel position t of the tiled RAW image data s (S34).

In S35 and S36, the prediction unit 29 performs the process of obtaining the difference data between the predicted value and the Gr component at the pixel position t of the tiled RAW image data S. Practically, the prediction unit 29 calculates the difference between the pixel value Grst at the pixel position t of the tiled RAW image data s of the Gr component and the obtained predicted value, thereby obtains the difference data in pixel value between the predicted value and the Gr component at the pixel position t of the tiled RAW image data s.

Then, it is determined whether or not t<m×n (S37). If the determination result is YES, then control is returned to S28, t is set to t+1 (t=t+1) in S28, and the above-mentioned process is repeated on the next pixel position.

Thus, by repeatedly performing the process in S28 through S37, the difference data between the Gr component and each of the color components of R, B, and Gb of the tiled RAW image data s, and the difference data between the predicted value and the Gr component of the tiled RAW image data s are obtained.

On the other hand, when the determination result in S37 is NO, then it is determined whether or not s <x/m×n (S38). If the determination result is YES, control is returned to S27, s is set to s+1 (s=s+1) in S27, and the above-mentioned process is repeated on the next tiled RAW image data.

Thus, repeatedly performing the process in S27 through S38, the difference data between the Gr component and each of the color components of R, B, and Gb and the difference data between the predicted value and the Gr component are obtained.

When the determination result in S38 is NO, the variable-length code unit 28 encodes the difference data between the Gr component and each of the color components of R, B, and Gb to obtain a variable-length code for each color component in tiled RAW image data units, and the variable-length code unit 30 encodes the difference data between the predicted value and the Gr component to obtain a variable-length code in tiled RAW image data units (S39).

Then, the data combination unit 31 combines the difference data between the Gr component and each of the color components of R, B, and Gb encoded in S39 to obtain a variable-length code for each color component by the variable-length code unit 28 in tiled RAW image data units with the difference data between the predicted value and the Gr component encoded in S39 to obtain a variable-length code by the variable-length code unit 30 intiled RAW image data units (S40), thereby terminating the flow.

As described above, according to the variation of the present embodiment, although the amount of data of the Bayer RAW image data obtained by capturing becomes enormously large, the subsequent processes can be efficiently performed by tiling the RAW image data of each color component after the separation. Thus, the data can be lossless compressed quickly at a high compression rate.

Embodiment 2

The present embodiment is different from the embodiment 1 only in RAW compressing process performed by the ASIC 8 under the control of the system controller 9. Therefore, only the RAW compressing process according to the present embodiment is explained below.

Figure 10:
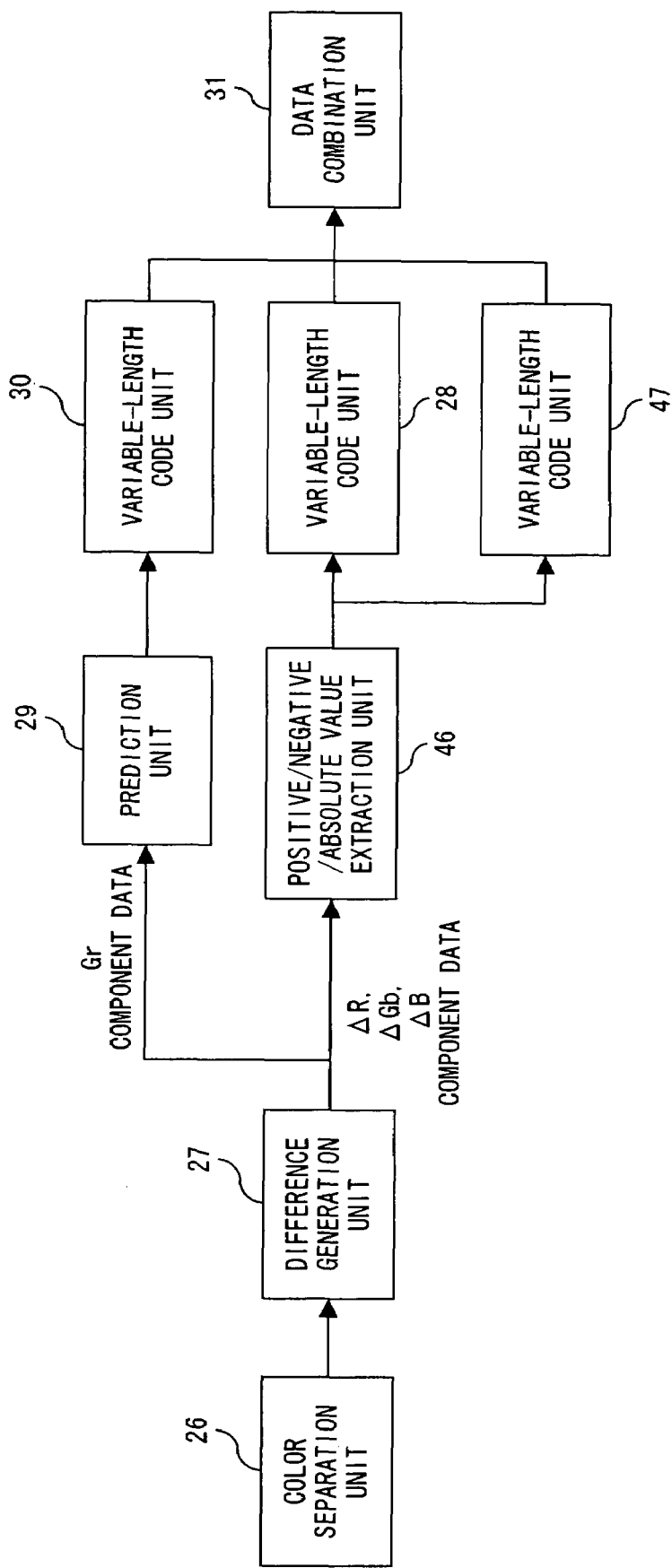
FIG. 10 is a block diagram showing the function relating to the RAW compressing process according to the embodiment 2.
Figure 11:
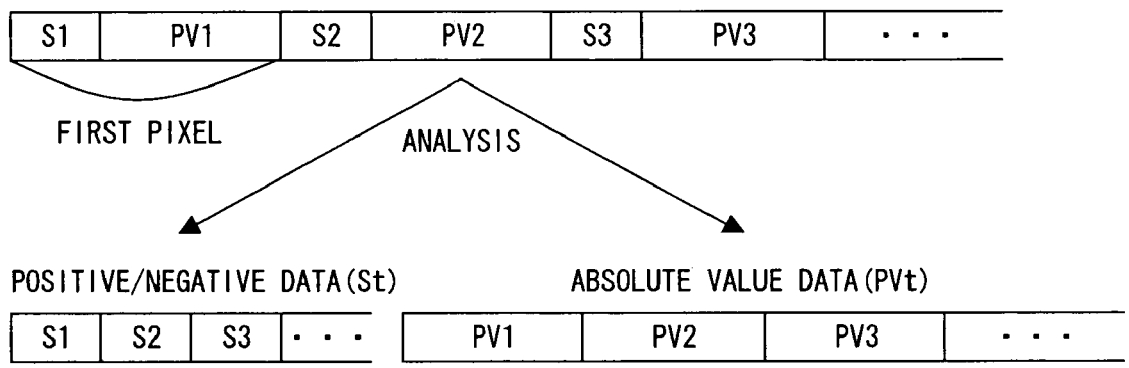
FIG. 11 is an explanatory view of the process performed by the positive/negative/absolute value extraction unit.

FIG. 10 is a block diagram showing the function relating to the RAW compressing process according to the present embodiment. Each component shown in FIG. 10 is realized by the ASIC 8 under the control of the system controller 9.

In FIG. 10, what are different from those shown in FIG. 3 are a positive/negative/absolute value extraction unit 46 provided between the difference generation unit 27 and the variable-length code unit 28, and a variable-length code unit 47. The positive/negative/absolute value extraction unit 46 separates and extracts each piece of difference data between the Gr component and each of the color components of R, B, and Gb into positive/negative data and absolute value data, and extracts the data. That is, the difference data between the Gr component and the R component is separated into positive/negative data and absolute value data and extracted, the difference data between the Gr component and the B component is separated into positive/negative data and absolute value data and extracted, and the difference data between the Gr component and the Gb component is separated into positive/negative data and absolute value data and extracted.

For example, each piece of the difference data between the Gr component and each of the color components of R, B, and Gb has the data structure having positive/negative data S and absolute value data Pv, the positive/negative/absolute value extraction unit 46 separates the difference data into positive/negative data S and absolute value data Pv and extracts the data. In FIG. 10, the positive/negative data St represents the positive/negative data at the pixel position t, and the absolute value data Pvt represents the absolute value data at the pixel position t.

In FIG. 10, the variable-length code unit 47 encodes the positive/negative data relating to the difference data of each of the color components of R, B, and Gb to obtain a variable-length code for each color component, and the variable-length code unit 28 encodes the absolute value data relating to the difference data of each of the color components of R, B, and Gb to obtain a variable-length code for each color component. Additionally, the data combination unit 31 combines the data encoded to obtain variable-length codes by the variable-length code units 30, 28, and 47.

FIG. 12 is a flowchart relating to the RAW compressing process.

In FIG. 12, first in S51 through S55, as in S1 through S5 shown in FIG. 6, the color separation unit 26 separates the Bayer RAW image data to be processed into each color component, and obtains the RAW image data formed by the pixels of m rows×n columns of each of the color components of Gr, R, B, and Gb.

Then, in the RAW image data of each of the color components of Gr, R, B, and Gb, the pixel position corresponding to each color component in space is specified by t (0≦t<m×n), and t is set to 0 (t=0) (S56).

Then, in S57 through S62, the difference generation unit 27 performs the process of obtaining the difference between the Gr component and each of the color component of R, B, and Gb at the pixel position t of the RAW image data, and the positive/negative/absolute value extraction unit 46 separates the difference of the color component into positive/negative values and absolute values and extracts the values. Practically, the difference generation unit 27 first calculates the difference $\Delta Rt$ between the pixel value Rt at the pixel position t of the RAW image data of the R component and the pixel value Grt at the pixel position t of the RAW image data of the Gr component (S57), thereby obtains the difference data between the Gr component and the R component at the pixel position t of the RAW image data (S58), and then the positive/negative/absolute value extraction unit 46 determines whether the value of $\Delta Rt$ is a positive value or a negative value (S59). If the determination result is a negative value, Str is set to the value of 1 indicating that the value is negative (Str=1), the absolute value of $\Delta Rt$ is set for PVrt (PVrt =abs (ΔRt)) (S60), and the positive/negative data Sr and the absolute value data PVb are obtained (S61). On the other hand, when the determination result in S59 is a positive value, then Str is set to 0 indicating that the value is positive (Srt=0), the absolute value of ΔRt is set for PVrt (PVrt=abs (ΔRt) ) (S62), and the positive/negative data and absolute value data are obtained (S63). Similarly, in S64 through S70, the positive/negative data Sb and the absolute value data PVb are obtained from the difference ΔBt between the Gr component and the B component at the pixel position of the RAW image data. In S71 through S77, the positive/negative data Sgb and the absolute value data PVgb are obtained from the difference data ΔGbt between the Gr component and the Gb component at the pixel position t of the RAW image data.

In S78 and S79, as in S13 and S14 shown in FIG. 6, the difference data between the predicted value and the Gr component at the pixel position t of the RAW image data is obtained.

Then, it is determined whether or not t<m×n (S80). If the determination result is YES, control is returned to S56, t=t+1 is set in S56, and the above-mentioned process is repeated on the next pixel position.

Thus, by repeating the processes in S57 through S80, the positive/negative data and the absolute value data relating to the difference data between the Gr component and each of the color components of R, B, and Gb are obtained, and the difference data between the predicted value and the Gr component is obtained.

When the determination result in S80 is NO, the variable-length code unit 28 encodes the absolute value data relating to the difference data between the Gr component and each of the color components of R, B, and Gb to obtain a variable-length code for each color component, the variable-length code unit 47 encodes the positive/negative data relating to the difference data between the Gr component and each of the color components of R, B, and Gb to obtain a variable-length code for each color component, and the variable-length code unit 30 encodes the difference data between the predicted value and the Gr component to obtain a variable-length code (S81)

Then, the data combination unit 31 combines the absolute value data relating to the difference data between the Gr component and each of the color component of R, B, and Gb encoded by the variable-length code unit 28 to obtain a variable-length code for each color component, the positive/negative data relating to the difference data between the Gr component and each of the color components of R, B, and Gb encoded by the variable-length code unit 47 to obtain a variable-length code for each color component, and the difference data between the predicted value and the Gr component encoded to obtain a variable-length code by the variable-length code unit 30 (S82), thereby terminating the flow.

According to the present embodiment, each piece of the difference data between the Gr component of a reference color and each of the color components of R, B, and Gb is separated into positive/negative data and absolute value data and extracted, and then encoded to obtain a variable-length code. Therefore, data can be lossless compressed at a high compression rate in encoding the data to obtain a variable-length code.

According to the present embodiment, the above-mentioned RAW compressing process can be varied as follows as with the variation according to the embodiment 1.

Figure 13:
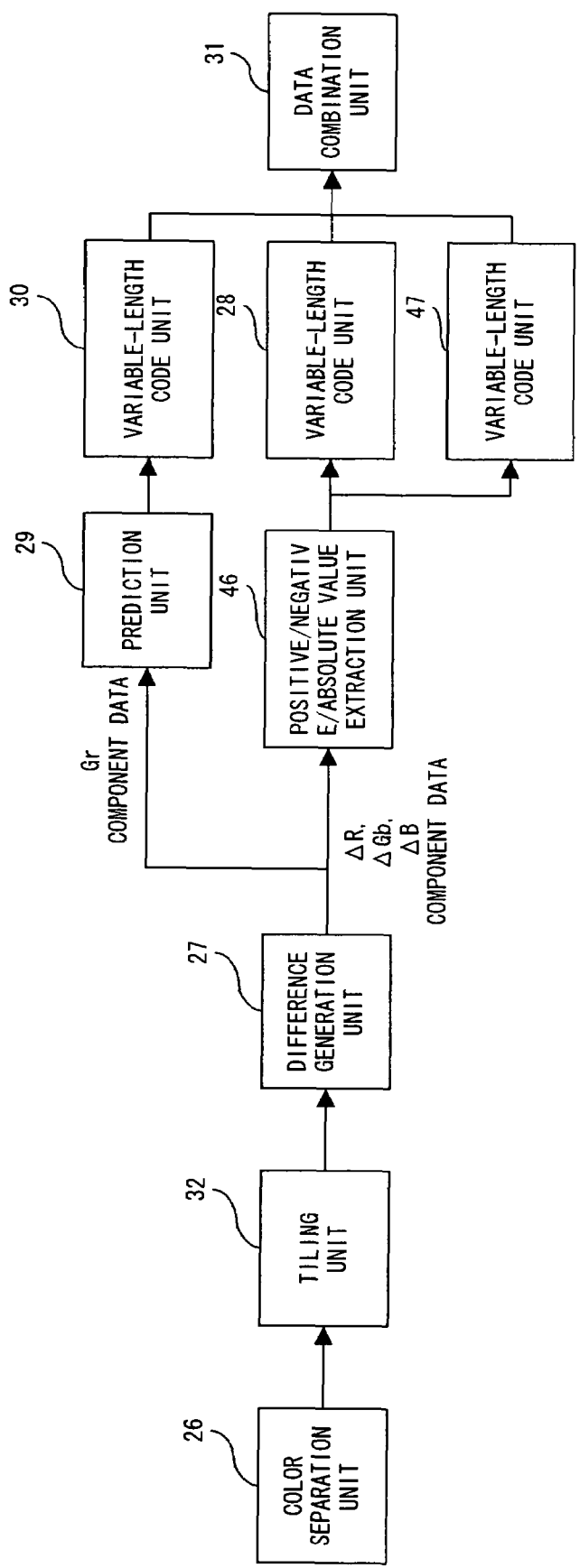
FIG. 13 is a block diagram showing the function relating to the RAW compressing process according to a variation of the embodiment 2.

FIG. 13 is a block diagram showing the function relating to the RAW compressing process according to a variation of the present embodiment. Each component shown in FIG. 13 can be realized by the ASIC 8 under the control of the system controller 9.

In FIG. 13, what is different from that shown in FIG. 10 is the tiling unit 32 between the color separation unit 26 and the difference generation unit 27 as with the variation according to the embodiment 1. The tiling unit 32 has already been described above, and the explanation is omitted here.

Figure 14:
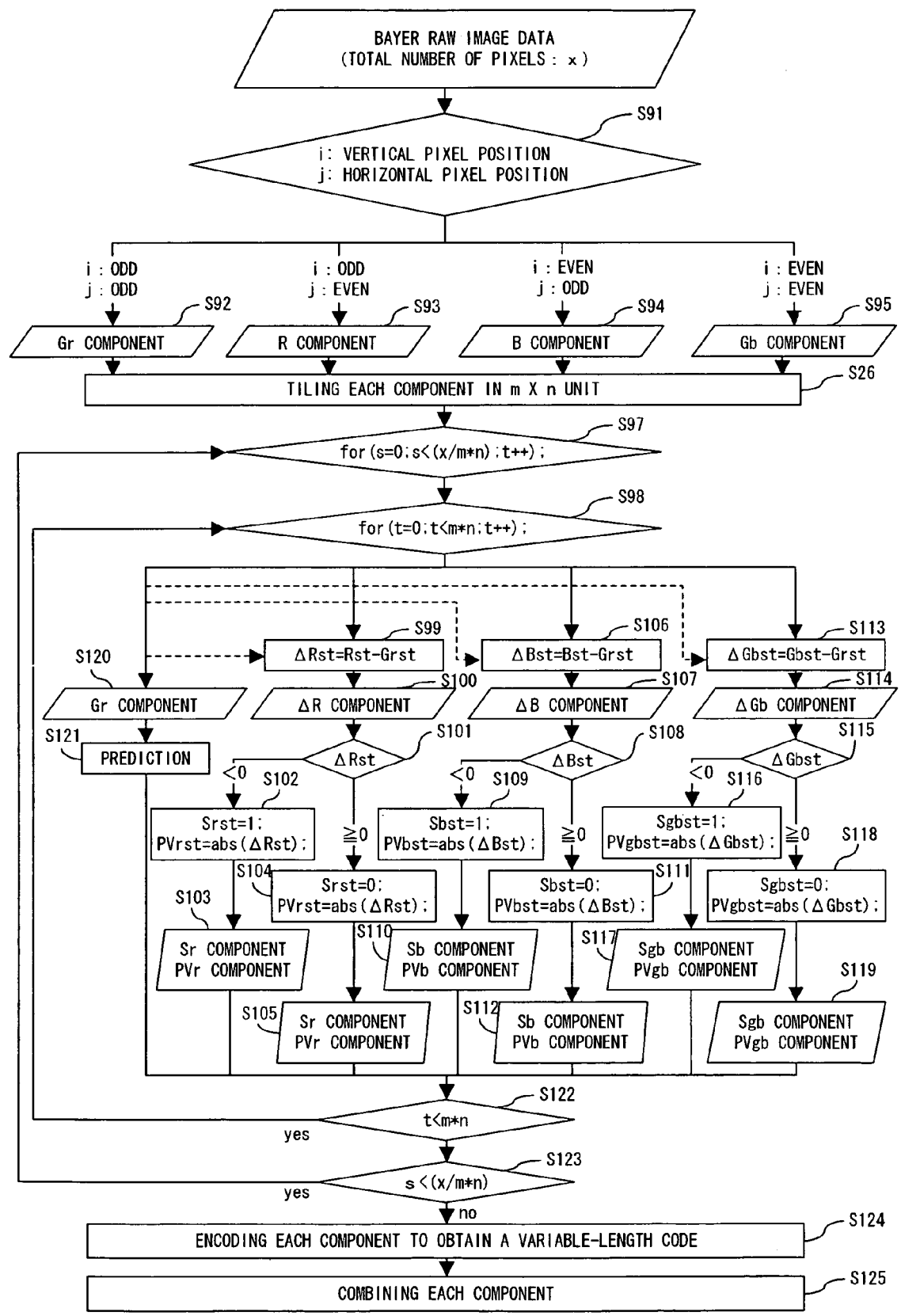
FIG. 14 is a flowchart relating to the RAW compressing process according to a variation of the embodiment 2.

FIG. 14 is a flowchart relating to the RAW compressing process according to the variation.

In FIG. 14, first in S91 through S95, as with S51 through S55 shown in FIG. 12, the color separation unit 26 separates the Bayer RAW image data (Bayer RAW image data of the total number x of pixels) to be processed into each color component.

Then, as in S26 shown in FIG. 9, the tiling unit 32 tiles each piece of the RAW image data separated by the color separation unit 26 into each color component into each piece of the RAW image data formed by the pixels of m rows×n columns (S96).

Then, as in S27 and S28 shown in FIG. 9, in the tiled RAW image data of each of the color components of Gr, R, B, and Gb, the tiled RAW image data corresponding in space of each color component is specified by s (0≦s<x/m×n), and in the tiled RAW image data specified by s of each color component, the pixel position corresponding in space of each color component is specified by t (0≦t<m×n), and s is set to 0 (s=0) (S97), and the t is set to 0 (t=0) (S98).

Then, in S99 through S119, the difference generation unit 27 performs the process of obtaining the difference between the Gr component and each of the color components of R, B, and Gb at the pixel position t of the tiled RAW image data s, and the positive/negative/absolute value extraction unit 46 performs the process of separating the difference of each color component into a positive/negative and absolute value and extracts the values. Practically, the difference generation unit 27 first calculates the difference ΔRst between the pixel value Rst at the pixel position t of the tiled RAW image data s of the R component and the pixel value Grst at the pixel position t of the tiled RAW image data s of the Gr component (S99), thereby obtains the difference data ΔR between the Gr component and the R component at the pixel position t of the tiled RAW image data s (S100), and then the positive/negative/absolute value extraction unit 46 determines whether the value of ΔRst is a positive value or a negative value (S101) . If the determination result is a negative value, Srst is set to 1 indicating that the value is negative (Srst=1), and PVrst is set to the absolute value of ΔRst (PVrst=abs (ΔRst)) (S102), thereby obtaining the positive/negative data Sr and the absolute value data PVr (S103). If the determination result in S101 is a positive value, Srst is set to 0 indicating that the value is positive (Srst=0), an absolute value of ΔRst is set for PVrst (PVrst=abs (ΔRst)) (S104), thereby obtaining the positive/negative data Sr and the absolute value data PVr (S105). Similarly, in S106 through S112, the positive/negative data Sb and the absolute value data PVb are obtained from the difference data ΔBst between the Gr component and the B component at the pixel position t of the tiled RAW image data s. In S113 through S119, the positive/negative data Sgb and the absolute value data PVgb are obtained from the difference data ΔGbst between the Gr component and the Gb component at the pixel position t of the tiled RAW image data s.

In S120 and S121, as in S78 and S79 shown in FIG. 12, the difference data between the predicted value and the Gr component at the pixel position t of the tiled RAW image data s is obtained.

Then, as in S37 shown in FIG. 9, it is determined whether or not t<m×n (S122). If the determination result is YES, control is returned to S98, t=t+1 is set in S98, and the above-mentioned process is repeated on the next pixel position.

Thus, by repeating the processes in S98 through S122, the positive/negative data and the absolute value data relating to the difference data between the Gr component and each of the color components of R, B, and Gb of the tiled RAW image data s are obtained, and the difference data between the predicted value and the Gr component of the tiled RAW image data s is obtained.

When the determination result in S122 is NO, as in S38 in FIG. 9, it is determined whether or not s<x/m×n (S123). If the determination result is YES, control is returned to step S97, s=s+1 is set in S97, the above-mentioned process is repeated on the next tiled RAW image data.

Thus, by repeatedly performing the processes in S97 through S123, the positive/negative data and absolute value data relating to the difference data between the Gr component and each of the color components of R, B, and Gb are obtained, and the difference data between the predicted value and the Gr component is also obtained.

When the determination result in S123 is NO, the variable-length code unit 28 encodes the absolute value data relating to the difference data between the Gr component and each of the color components of R, B, and Gb to obtain a variable-length code for each color component in tiled RAW image data units. The variable-length code unit 47 encodes the positive/negative data relating to the difference data between the Gr component of each of the color components of R, B, and Gb to obtain a variable-length code for each color component in tiled RAW image data units. The variable-length code unit 30 encodes the difference data between the predicted value and the Gr component to obtain a variable-length code in tiled RAW image data units (S124).

Then, the data combination unit 31 combines the absolute value data relating to the difference data between the Gr component and each of the color components of R, B, and Gb encoded in S124 to obtain a variable-length code by the variable-length code unit 28 for each color component in tiled RAW image data units, the positive/negative data relating to the difference data between the Gr component and each of the color components of R, B, and Gb encoded in S124 to obtain a variable-length code by the variable-length code unit 47 for each color component in tiled RAW image data units, and the difference data between the predicted value and the Gr component encoded in S124 to obtain a variable-length code by the variable-length code unit 30 in tiled RAW image data units (S125), thereby terminating the present flow.

According to the variation of the present embodiment, as in the variation according to the embodiment 1, although the amount of data of the Bayer RAW image data obtained by capturing becomes enormously large, the subsequent processes can be efficiently performed by tiling the RAW image data of each color component after the separation. Therefore, data can be lossless compressed quickly at a high compression rate.

Embodiment 3

Also according to the present embodiment, only the difference from the embodiment 1 is the RAW compressing process performed by the ASIC 8 under the control of the system controller 9. Therefore, only the RAW compressing process according to the present embodiment is explained here.

Figure 15:
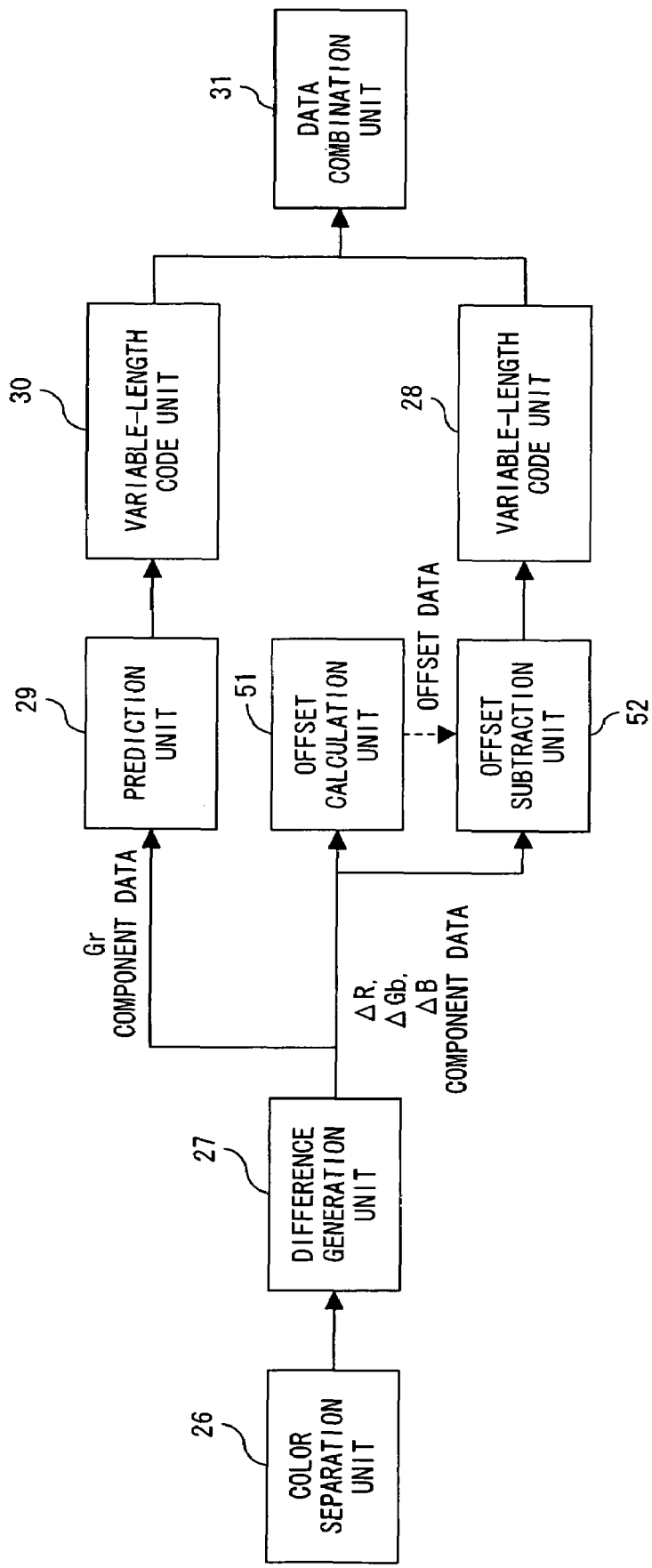
FIG. 15 is a block diagram showing the function relating to the RAW compressing process according to the embodiment 3.

FIG. 15 is a block diagram of the function relating to the RAW compressing process according to the present embodiment. Each component shown in FIG. 15 is realized by the ASIC 8 under the control of the system controller 9

In FIG. 15 what is different from those shown in FIG. 3 is an offset calculation unit 51 and an offset subtraction unit 52 provided between the difference generation unit 27 and the variable-length code unit 28. The offset calculation unit 51 obtains offset data about each of the color components from the difference data between the Gr component and each of the color components of R, B, and Gb, and the offset subtraction unit 52 subtracts corresponding offset data from the difference data between the Gr component and each of the color components of R, B, and Gb.

As described above by referring to the embodiment 1, each piece of the difference data between the Gr component and each of the color components of R, B, and Gb obtained by the difference generation unit 27 is considered to have a locally distributed value around a certain offset value. That is, each of the color components of the R, B, and Gb is considered to have a locally distributed value having the central values of r, b, and gb respectively. Especially, since the Gb component is the same color component as the Gr component of the reference color, it is predicted that the data has values locally distributed around 0.

Therefore, each of the color components of the R, B, and Gb can have the data whose values are locally distributed with the central value of 0 by subtracting the offset of r, b, and gb respectively from the color components of the R, B, and Gb, and the variable-length code unit 28 at the subsequent stage can efficiently perform compression. However, when data is lossless compressed as in the present embodiment, it is necessary to assign integers to r, b, and gb.

For example, when the difference data between the Gr component and the R component of the RAW image data is the data having values locally distributed including offset R of as shown in FIG. 16A, the difference data can have locally distributed values with 0 set as the central value as shown in FIG. 16C by subtracting the offset R of as shown in FIG. 16B.

Furthermore, in FIG. 15, the variable-length code unit 28 encodes the difference data between the Gr component and each of the color components of R, B, and Gb from which the offset data is subtracted to obtain a variable-length code for each color component.

FIG. 17 is a flowchart relating to the RAW compressing process In FIG. 17, first in S131 through S135, as in S1 through S5 shown in FIG. 6, the color separation unit 26 separates the Bayer RAW image data (Bayer RAW image data of the total number x of pixels) to be processed into each color component and obtains the RAW image data having the pixels of m rows×n columns of each of the color components of Gr, R, B, and Gb.

Then, in the RAW image data of each of the color components of Gr, R, B, and Gb, the pixel position corresponding to each color component in space is specified by t ($0 \leq t < m \times n$), and t is first set to 0 (t=0) (S136). Before starting the process in S136, the value of the variables ofr, ofb, and ofg to be used in obtaining the offset data of each of the color components of R, B, and Gb is cleared.

Then, in S137 through S144, the difference generation unit 27 performs the process of obtaining the difference between the Gr component and each of the color components of R, B, and Gb at the pixel position t of the RAW image data, and the offset calculation unit 51 performs the process of obtaining offset data. Practically, the difference generation unit 27 calculates the difference $\Delta Rt$ between the pixel value Rt at the pixel position t of the RAW image data of the R component and the pixel value Grt at the pixel position t of the RAW image data of the Gr component (S137), thereby obtains the difference data $\Delta R$ between the Gr component and the R component at the pixel position t of the RAW image data (S138), and the offset calculation unit 51 adds $\Delta Rt$ to ofr (ofr=ofr+$\Delta Rt$) (S139). Similarly, in S140 through S142, the difference generation unit 27 calculates the difference $\Delta Bt$ (S140), thereby obtains the difference data $\Delta B$ between the Gr component and the B component at the pixel position t of the RAW image data (S141), and the offset calculation unit 51 adds $\Delta Bt$ to ofb (ofb=ofb+$\Delta Bt$) (S142). In S143 through S145, the difference generation unit 27 calculates the difference $\Delta Gbt$ (S143), thereby obtains the difference data $\Delta Gb$ between the Gr component and the Gb component at the pixel position t of the RAW image data (S144), and the offset calculation unit 51 adds $\Delta Gbt$ to ofgb (ofgb=ofgb+$\Delta Gbt$) (S145).

In S146 through S148, as in S13 and S14 shown in FIG. 6, the difference generation unit 27 obtains the difference data between the predicted value and the Gr component at the pixel position t of the RAW image data.

Then, as in S15 shown in FIG. 6, it is determined whether or not t<m×n (S149). If the determination result is YES, control is returned to S136, t=t+1 is set in S136, and the above-mentioned process is repeated on the next pixel position.

Thus, by repeating the processes in S136 through S149, the difference data between the Gr component and each of the color components of R, B, and Gb, ofr which is a total of differences relating to the difference data between the Gr component and the R component, ofb which is a total of differences relating to the difference data between the Gr component and the B component, ofgb which id a total of the difference relating to the difference data between the Gr component and the Gb component, and the difference data between the predicted value and the Gr component are obtained.

When the determination result in S149 is NO, the offset calculation unit 51 performs the calculation of the offset data on each of the color components of R, B, and Gb, and the offset subtraction unit 52 performs the process of subtracting the corresponding offset data respectively from the difference data between the Gr component and each of the color components of R, B, and Gb in the subsequent S150 through S156. Practically, in S150 and S151, the offset calculation unit 51 calculates the offset ofr of the R component by ofr=round (ofr×4/x) (S150), the offset subtraction unit 52 subtracts ofr obtained in S150 from the pixel value at each pixel position of the difference data between the Gr component and the R component (S151) Similarly, in S152 through S153, the offset calculation unit 51 calculates the offset ofb of the B component (S152), and the offset subtraction unit 52 subtracts the ofb obtained in S152 from the pixel value at each pixel position of the difference data between the Gr component and the B component (S153). In S154 and S155, the offset calculation unit 51 calculates the offset ofgb of the Gb component (S154), and the offset subtraction unit 52 subtracts the ofgb obtained in S154 from the pixel value of each pixel position of the difference data between the Gr component and the Gb component (155). The difference data between the predicted value and the Gr component is input as is to the variable-length code unit 30 (S156).

Then, the variable-length code unit 28 encodes the difference data between the Gr component and each of the color components of R, B, and Gb from which the offset data has been subtracted to obtain a variable-length code, and the variable-length code unit 30 encodes the difference data between the Gr component and the predicted value to obtain a variable-length code (S157).

Then, the data combination unit 31 combines the difference data between the Gr component and each of the color components of R, B, and Gb encoded by the variable-length code unit 28 to obtain a variable-length code for each color component, and the difference data between the predicted value and the Gr component encoded to obtain a variable-length code by the variable-length code unit 30 (S158), thereby terminating the flow.

As described above, according to the present embodiment, corresponding offset data is subtracted respectively from the difference data between the Gr component of the reference color and each of the color components of R, B, and Gb and encode to obtain a variable-length code, thereby realizing lossless compression at a high compression rate in encoding the data to obtain a variable-length code.

Also according to the present embodiment, the above-mentioned RAW compressing process can be transformed as follows as in the variation of the embodiment 1.

Figure 18:
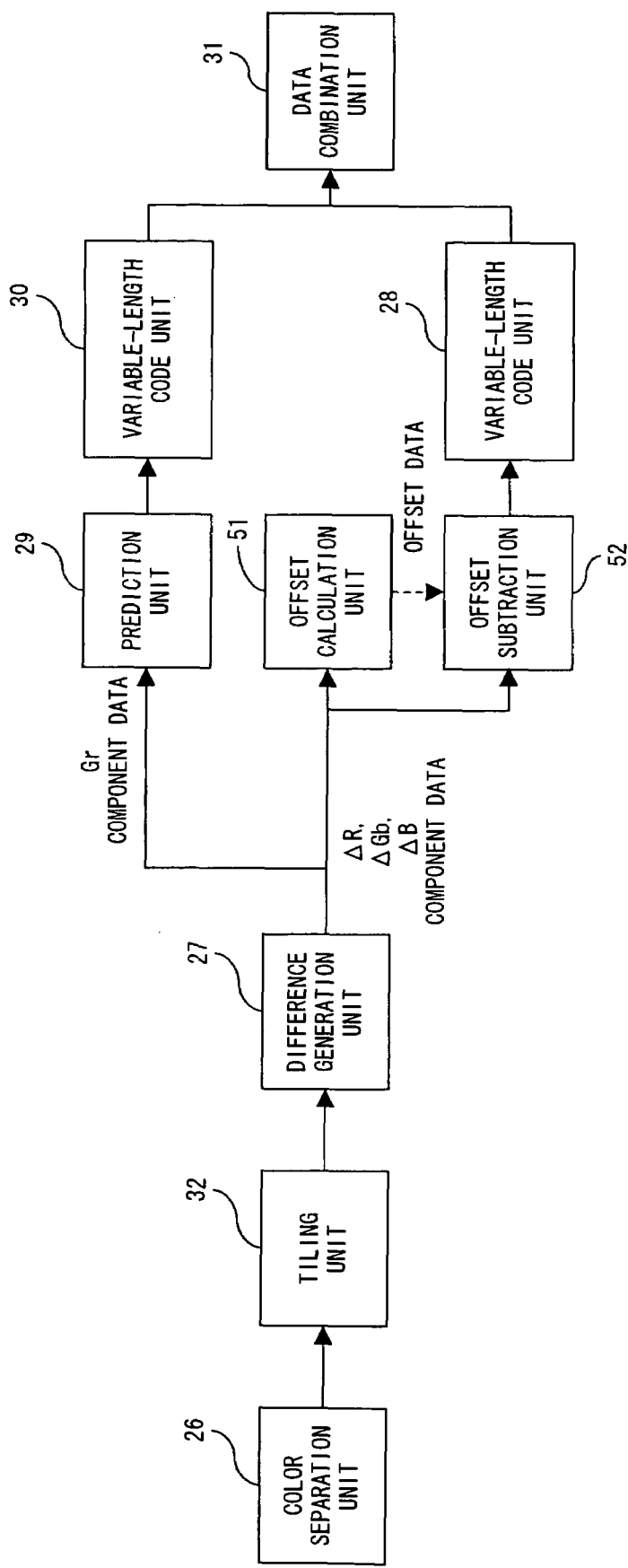
FIG. 18 is a block diagram showing the function relating to the RAW compressing process according to a variation of the embodiment 3.

FIG. 18 is a block diagram of the function relating to the RAW compressing process according to the variation of the present embodiment. Each of the color components shown in FIG. 18 is also realized by the ASIC 8 under the control of the system controller 9.

In FIG. 18, what is different from that shown in FIG. 15 is, as in the variation of the embodiment 1, a tiling unit 32 provided between the color separation unit 26 and the difference generation unit 27. The tiling unit 32 is described above, and the explanation is omitted here.

Figure 19:
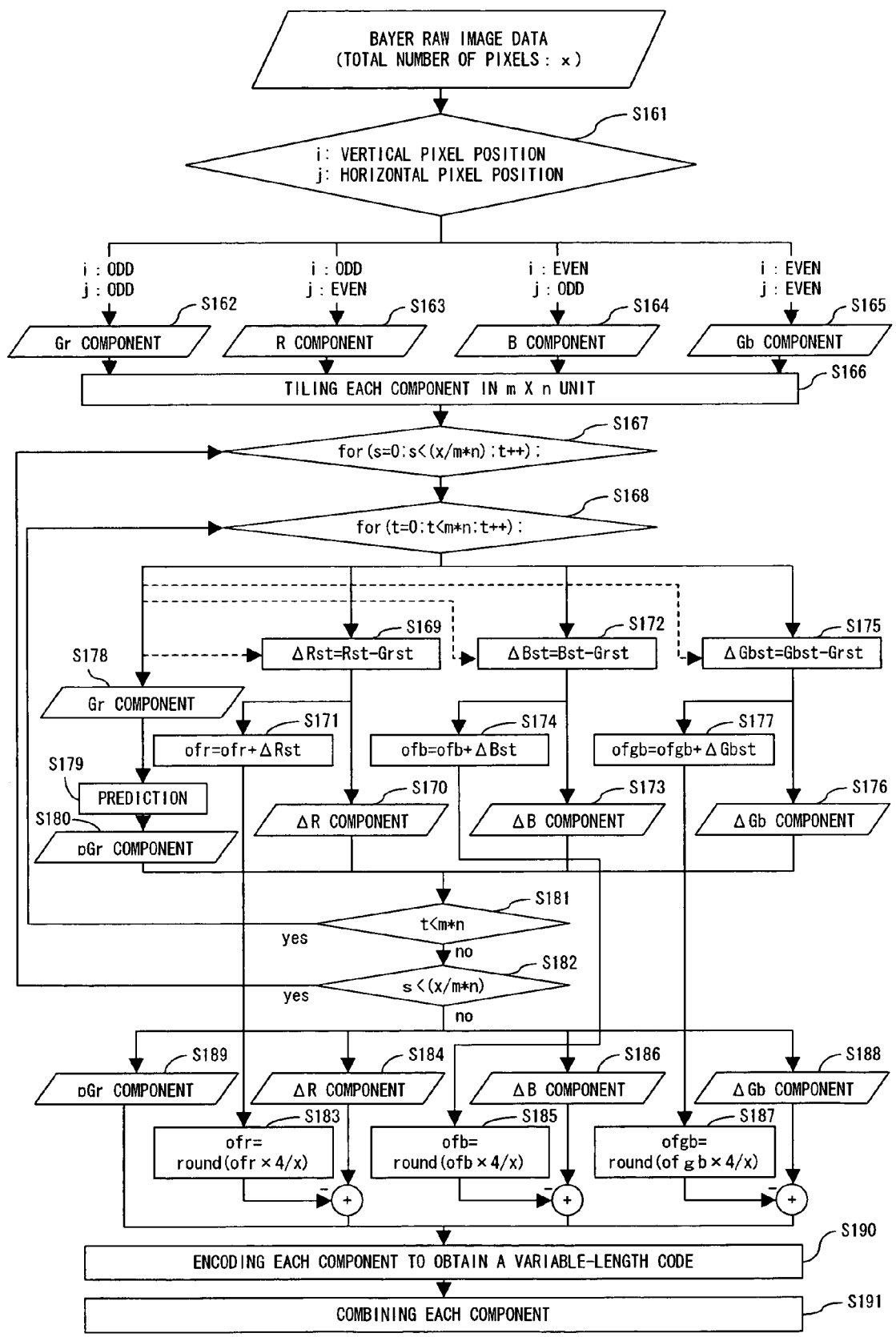
FIG. 19 is a flowchart relating to the RAW compressing process according to a variation of the embodiment 3.

FIG. 19 is a flowchart relating to the RAW compressing process relating to the variation.

In FIG. 19, first in S161 through S165, as in S131 through S135 shown in FIG. 17, the color separation unit 26 separates the Bayer RAW image data (Bayer RAW image data of a total number x of pixels) to be processed into each color component.

As in S26 shown in FIG. 9, the tiling unit 32 tiles each of the RAW image data separated into color components by the color separation unit 26 for each piece of RAW image data formed by the pixels of m rows×n columns (S166).

Then, as in S27 and S28 shown in FIG. 9, in the tiled RAW image data of each of the color components of Gr, R, B, and Gb, the tiled RAW image data corresponding in space of each color component is specified by s ($0 \leq s < x/m \times n$), and in the tiled RAW image data designated by s of each color component, the pixel position corresponding in space of each color component is designated by t ($0 \leq t < m \times n$), s is first set to 0 (s=0) (S167), and then t is set to 0 (t=0) (S168). Before starting the process in S167, the value of each of the variables ofr, ofb, and ofg to be used in obtaining the offset data of each of the color components of R, B, and Gb is cleared.

Then, in S169 through S177, the difference generation unit 27 performs the process of obtaining the difference between the Gr component and each of the color components of R, B, and Gb at the pixel position t of the tiled RAW image data s, and the offset calculation unit 51 performs the process of obtaining the offset data. Practically, the difference generation unit 27 calculates the difference $\Delta Rst$ between the pixel value Rst at the pixel position t of the tiled RAW image data s of the R component and the pixel value Grst at the pixel position t of the tiled RAW image data s of the Gr component (F169), thereby obtains the difference data $\Delta R$ between the Gr component and the R component at the pixel position t of the tiled RAW image data s (S170), and the offset calculation unit 51 adds the $\Delta Rst$ to ofr (ofr=ofr+$\Delta Rst$) (S171). Similarly, in S172 through S174, the difference generation unit 27 calculates the difference $\Delta Bst$ (S172), thereby obtains the difference data $\Delta B$ between the Gr component and the B component at the pixel position t of the tiled RAW image data s (S173), and the offset calculation unit 51 adds $\Delta Bst$ to ofb (ofb=ofb+$\Delta Bst$) (S174). In S175 through S177, the difference generation unit 27 calculates the difference $\Delta Gbst$ (S175), thereby obtains the difference data ΔGb between the Gr component and the Gb component at the pixel position t of the tiled RAW image data s (S176), and the offset calculation unit 51 adds ΔGbst to ofgb (ofgb=ofgb+ΔGbst) (S177).

In S178 through S180, as in S35 and S36 shown in FIG. 9, the difference generation unit 27 obtains the difference data between the predicted value and the Gr component at the pixel position t of the tiled RAW image data s.

Then, as in S37 shown in FIG. 9, it is determined whether or not t<m×n (S181). If the determination result is YES, control is returned to S168, and t=t+1 is set in S168, and the above-mentioned process is repeated on the next pixel position.

As described above, by repeating the processes in S168 through S181, the difference data between the Gr component and each of the color components of R, B, and Gb of the tiled RAW image data s, ofr which is a total of ΔRst, ofb which is a total of ΔBst, fgb which is a total of ΔGbst, and the difference data between the predicted value and the Gr component of the tiled RAW image data s are obtained.

If the determination result in S181 is NO, then as in S38 shown in FIG. 9, it is determined whether or not s<x/m×n (S182). If the determination result is YES, control is returned to S167, s=s+1 is set in S167, and the above-mentioned process is repeated on the next tiled RAW image data.

Thus, by repeating the processes in S167 through S182, the difference data between Gr component and each of the color components of R, B, and Gb, ofr which is a total of the differences relating to the difference data between the Gr component and the R component, ofb which is a total of the differences relating to the difference data between the Gr component and the B component, ofgb which is a total of the differences relating to the difference data between the Gr component and the Gb component, and the difference data between the predicted value and the Gr component are obtained.

When the determination result in S182 is NO, the offset calculation unit 51 performs the process of calculating the offset data about each of the color components of R, B, and Gb and the offset subtraction unit 52 performs the process of subtracting the corresponding offset data respectively from the difference data between the Gr component and each of the color components of R, B, and Gb in the tiled RAW image data units in the subsequent S183 through S189. Practically, in S183 and S184, the offset calculation unit 51 calculates the offset ofr of the R component by ofr=round (ofr×4/x) (S183), and the offset subtraction unit 52 subtracts ofr obtained in S183 respectively from the pixel value at each pixel position of the difference data between the Gr component and the R component in the tiled RAW image data units of the R component (S184). Similarly, in S185 and S186, the offset calculation unit 51 calculates offset ofb of the B component (S185) and the offset subtraction unit 52 subtracts ofb obtained in S185 respectively from the pixel value at each pixel position of the difference data between the Gr component and the B component in the tiled RAW image data units of the B component (S186) In S187 and S188, the offset calculation unit 51 calculates offset ofgb of the Gb component (S187), and the offset subtraction unit 52 subtracts ofgb obtained in S187 respectively from the pixel value of each pixel position of the difference data between the Gr component and the Gb component in the tiled RAW image data units of the Gb component (S188). The difference data between the predicted value and the Gr component is input as is to the variable-length code unit 30 (S189).

Then, the variable-length code unit 28 encodes the difference data between the Gr component and each of the color components of R, B, and Gb from which the offset data has been subtracted to obtain a variable-length code for each color component in the tiled RAW image data units, and the variable-length code unit 30 encodes the difference data between the predicted value and the Gr component to obtain a variable-length code in the tiled RAW image data units (S190).

Then, the data combination unit 31 combines in S190 the difference data between the Gr component and each of the color components of R, B, and Gb encoded by the variable-length code unit 28 for each color component to obtain a variable-length code in the tiled RAW image data units, and the difference data between the predicted value and the Gr component encoded to obtain a variable-length code by the variable-length code unit 30 in the tiled RAW image data units (S191), thereby terminating the flow.

According to the variation of the present embodiment, as in the variation according to the embodiment 1, although the amount of data of the Bayer RAW image data obtained by capturing becomes enormously large, the subsequent processes can be efficiently performed by tiling the RAW image data of each color components after the separation. Therefore, data can be lossless compressed quickly at a high compression rate.

As described above by referring to embodiments 1 through 3, an image pickup device of an electronic camera applied in each of the embodiments is not limited to an image pickup device of an electronic camera to which a color filter array of a Bayer array is arranged, but an image pickup device having a color filter array of other arrays such as a complementary color filter, etc. can be applied. In each embodiment, the coding process is performed immediately before combining data. However, the present invention is not limited to this application, but the coding process can be performed after combining data.

The present invention is described above in detail, but it is not limited to the above-mentioned embodiments, but can be improved or amended within the gist of the present invention.

As described above in detail, according to the present invention, for example, image data obtained by an image pickup device such as Bayer RAW image data, etc. can be lossless compressed quickly at a high compression rate. Furthermore, the lossless compression can be realized with a simple configuration.

What is claimed is:

1. An image compressing method comprising:
   separating image data obtained from an image pickup device into a plurality of color components;
   applying a predetermined color component from among the plurality of color components as a reference color;
   obtaining difference data expressing a difference between each piece of image data of color components of colors other than the reference color from among the plurality of color components, and the image data of the color component of the reference color;
   encoding the difference data to obtain a variable-length code; and
   performing prediction coding of the image data of the color component of the reference color.

2. An image compression apparatus comprising:
   a color separation unit separating image data obtained from an image pickup device into a plurality of color components;
   a selection unit selecting a predetermined color component from among the plurality of color components as a reference color;

a difference generation unit obtaining difference data expressing a difference between each piece of image data of color components of colors other than the reference color from among the plurality of color components, and the image data of the color component of the reference color;

a variable-length code unit the difference data obtained by the difference generation unit to obtain a variable-length code; and a prediction coding unit performing prediction coding of the image data of the color component of the reference color.

3. The image compression apparatus according to claim 2, wherein the color separation unit separates image data obtained from an image pickup device into a Gr (green) component, a R (red) component, a B (blue) component, and Gb (green) component, the difference generation unit obtains the difference data as the Gr component being a reference color, the predicted code unit encodes the image data of the Gr component to obtain a predicted code.

4. The image compressing apparatus according to claim 3, wherein the difference data between each piece of the image data of the color components of R, B, and Gb are obtained by a first equation, a second equation and a third equation, wherein, the first equation is:

$$\Delta R = R(i,j) - Gr(i,j)$$

wherein the second equation is:

$$\Delta B = B(i,j) - Gr(i,j)$$

wherein the third equation is:

$$\Delta Gb = Gb(i,j) - Gr(i,j)$$

wherein $1 \leq i \leq m$, $1 \leq j \leq n$, wherein each piece of the image data is image data formed by the pixels of m rows×n columns, and that corresponding pixel position of each color component is expressed by (row, column)=(i, j), and wherein Gr (i, j) indicates a pixel value of the pixel position (i, j) of image data of the Gr component, R (i, j) indicates a pixel value of the pixel position (i, j) of image data of the R component B (i, j) indicates a pixel value of the pixel position (i, j) of image data of the B component, Gb (i, j) indicates a pixel value of the pixel position (i, j) of image data of the Gb component, ΔR indicates a difference in pixel value between the pixel position (i, j) of image data of the R component and the pixel position (i, j) of image data of the Gr component, ΔB indicates a difference in pixel value between the pixel position (i, j) of image data of the B component and the pixel position (i, j) of image data of the Gr component, and ΔGb indicates a difference in pixel value between the pixel position (i, j) of image data of he Gb component and the pixel position (i, j) of image data of the Gr component.

5. An image compressing method comprising:

separating image data obtained from an image pickup device into a Gr (green) component, a R (red) component, a B (blue) component, and Gb (green) component;

obtaining difference data expressing a difference between each piece of image data of color component of colors other than the Gr component, and the image data of the Gr component;

encoding the difference data to obtain a variable-length code; and performing prediction coding of the image data of the Gr component.

6. The image compressing method according to claim 5, wherein the difference data between each piece of the image data of the color components of R, B, and Gb are obtained by a first equation, a second equation and a third equation, wherein the first equation is:

$$\Delta R = R(i,j) - Gr(i,j)$$

wherein the second equation is:

$$\Delta B = B(i,j) - Gr(i,j)$$

wherein the third equation is:

$$\Delta Gb = Gb(i,j) - Gr(i,j)$$

wherein $1 \leq i \leq m$, $1 \leq j \leq n$ wherein each piece of the image data is image data formed by the pixels of in rows×n columns, and that corresponding pixel position of each color competent is expressed by (row, column)=(i, j); and wherein Gr (i, j) indicates a pixel value of the pixel position (i, j) of image data of the Gr component, R (i, j) indicates a pixel value of the pixel position (i, j) of image data of the R component, B (i, j) indicates a pixel value of the pixel position (i, j) of image data of the B component, Gb (i, j) indicates a pixel value of the pixel position (i, j) of image data of the Gb component, ΔR indicates a difference in pixel value between the pixel position (i, j) of image data of the R component and the pixel position (i, j) of image data of the Gr component, ΔB indicates a difference in pixel value between the pixel position (i, j) of image data of the B component and the pixel position (i, j) of image data of the Gr component, and ΔGb indicates a difference in pixel value between the pixel position (i, j) of image data of the Gb component and the pixel position (i, j) of image data of the Gr component.

* * * * *

UNITED STATES PATENT AND TRADEMARK OFFICE
CERTIFICATE OF CORRECTION

PATENT NO. : 7,593,148 B2
APPLICATION NO. : 11/082467
DATED : September 22, 2009
INVENTOR(S) : Ishikawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1173 days.

Signed and Sealed this

Twenty-first Day of September, 2010

David J. Kappos
*Director of the United States Patent and Trademark Office*